INVENTORS
PHIL H. WEISS
ABRAHAM M. REITER
BY Lyon & Lyon
ATTORNEYS

INVENTORS
PHIL H. WEISS
ABRAHAM M. REITER
BY Lyon & Lyon
ATTORNEYS

INVENTORS
PHIL H. WEISS
ABRAHAM M. REITER
BY Lyon & Lyon
ATTORNEYS

SUBSCRIPTION TELEVISION SYSTEM

Filed June 16, 1958

INVENTORS
PHIL H. WEISS
ABRAHAM M. REITER
BY Lyon & Lyon
ATTORNEYS

INVENTORS
PHIL H. WEISS
ABRAHAM M. REITER
BY Lyon & Lyon
ATTORNEYS

Sept. 19, 1961 P. H. WEISS ET AL 3,001,011

SUBSCRIPTION TELEVISION SYSTEM

Filed June 16, 1958 8 Sheets-Sheet 6

INVENTORS
PHIL H. WEISS
ABRAHAM M. REITER
BY
Lyon & Lyon
ATTORNEYS

INVENTORS
PHIL H. WEISS
ABRAHAM M. REITER
BY Lyon & Lyon
ATTORNEYS

SUBSCRIPTION TELEVISION SYSTEM

Filed June 16, 1958

8 Sheets-Sheet 8

INVENTORS
PHIL H. WEISS
ABRAHAM M. REITER
BY Lyon & Lyon
ATTORNEYS.

3,001,011

SUBSCRIPTION TELEVISION SYSTEM

Phil H. Weiss, Panorama City, and Abraham M. Reiter, Reseda, Calif., assignors, by mesne assignments, to Paramount Pictures Corporation, New York, N.Y., a corporation of New York Filed June 16, 1958, Ser. No. 742,114
19 Claims. (Cl. 178—5.1)

This invention relates to subscription television systems and, more particularly, to improvements therein.

A subscription television system appears to require an arrangement at a transmitter which transmits a program in a form which may be termed "scrambled" or not reconstructable into anything recognizable by a nonsubscriber or an unpaid subscriber television receiver. Subscriber receivers are usually modified, or have some form of an attachment which enables them to unscramble the scrambled transmission, either after actually making a cash payment of a value demanded for seeing the program, or by agreeing to assume liability for the cost of the program. Such agreement for liability assumption can be made in any number of different ways, such as a recording at the receiver, or calling a telephone operator and requesting the transmission to the receiver of a decoding signal. All the presently proposed subscription television systems have common problems. These have to do with the scrambling of the program at the transmitter and the unscrambling of the program at the receiver. A number of different solutions for these problems were obtained. It was soon found, however, that while the actual hardware for performing scrambling, unscrambling, and charging operations was available, the economics of the situation introduced stumbling blocks in the paths of the proponents of the different systems.

Since the scope of application of the subscription television system is intended to approach the scope of the free television system, any modification at a receiver or any attachment at a receiver, of necessity, must be inexpensive, or else the number of subscribers to the system will be too few to make it economically feasible. In this connection, it was found that in order to reduce the cost of a receiver attachment or modification to a reasonable value, it was necessary to reduce the "security" of the scrambled transmission to such an extent that the security remaining was hardly effective. Therefore, compromises were made which left systems having some degree of security in the transmission and some degree of complexity in the receiver modification and/or attachment.

One of the principal objects of the present invention is the provision of a subscription television system where there is provided excellent security in the scrambled program transmission with a minimal cost for the unscrambling equipment at the subscriber receiver.

Another object of the present invention is the provision of a simplified subscription television system.

Yet another object of the present invention is the provision of a unique and inexpensive subscription television system which preserves security and yet enables an inexpensive attachment to be used at a subscriber receiver for unscrambling a transmitted program.

These and other objects of the present invention are achieved in a program-security-preserving arrangement wherein the horizontal blanking and synchronizing pulses in the composite video waveform are replaced by a pulse having an amplitude in the grey level region of the video signal. A reconstituting signal is generated having the frequency of horizontal synchronizing pulses. The composite video signal, including the grey signals and the reconstituting signal, is transmitted on separate carriers.

There are also generated signals which are called "nonsense audio." The program audio and nonsense audio are transmitted over two channels and are interchanged with respect to the two channels at random intervals and in a manner to prevent unauthorized persons from detecting the occurrence of this change. The transmitter also has a circulating counter driven at the vertical sync signal rate. Means are provided for selecting certain counts for establishing the price of a program and the time for switching the program sound and nonsense sound between the two carriers. Two tones are generated, one or the other of which may be transmitted during the interval of the last three lines of the field. These tones are transmitted in response to counter output and the counts selected to provide the price and audio-switching information. The transmitter combines all these various signals and transmits them to the subscriber receivers.

At the subscriber receiver there is provided an attachment which is interposed between the antenna and the antenna terminals in the receiver. This attachment may include a coinbox wherein the price for viewing a program may be established. This coinbox may be automatically actuated from the transmitter or may be manually actuated to indicate a price which the subscriber has learned, either through a broadcast or through the papers, that must be paid for viewing the program. The subscriber, along with turning a control for indicating the price in the box, also turns two other controls which set selector switches to positions, the information for which is obtained in the same manner as that for the coinbox.

A cyclic counter is employed at the receiver, which may be identical with that at the transmitter. Logic is provided for advancing the cyclic counter in accordance with the tone signals received over the air. This logic insures that the count condition of the receiver counter is identical with the count condition of the transmitter counter, and, further, that the settings of the coinbox and the selector switches is proper. Otherwise, a light indicative of the unsatisfactory situation is illuminated, the subscriber does not get the required sync signals for the composite video, and he hears audio nonsense, instead of program sound. Should the settings for the selector switches and coinbox be properly made, then, upon payment of the amount of money called for, the attachment will switch the audio system in the receiver from the barker-audio-receiving channel to the program-audio-receiving channel.

At this time, the receiver attachment also applies the received reconstituting signals at the sync frequency to circuitry to derive rectangular pulses. This is used to increase the gain of an RF amplifier, to which the composite video modulated on its carrier is also applied, so that effectively the proper synchronizing information is restored. The composite video signal is then applied to the receiver antenna terminals and is thereafter handled like any normal composite video signal. In the event that a receiver is not equipped with an attachment or a receiver has an attachment and payment of the required sum is not made, then the program video and audio are both scrambled in such a manner that they provide no intelligence.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
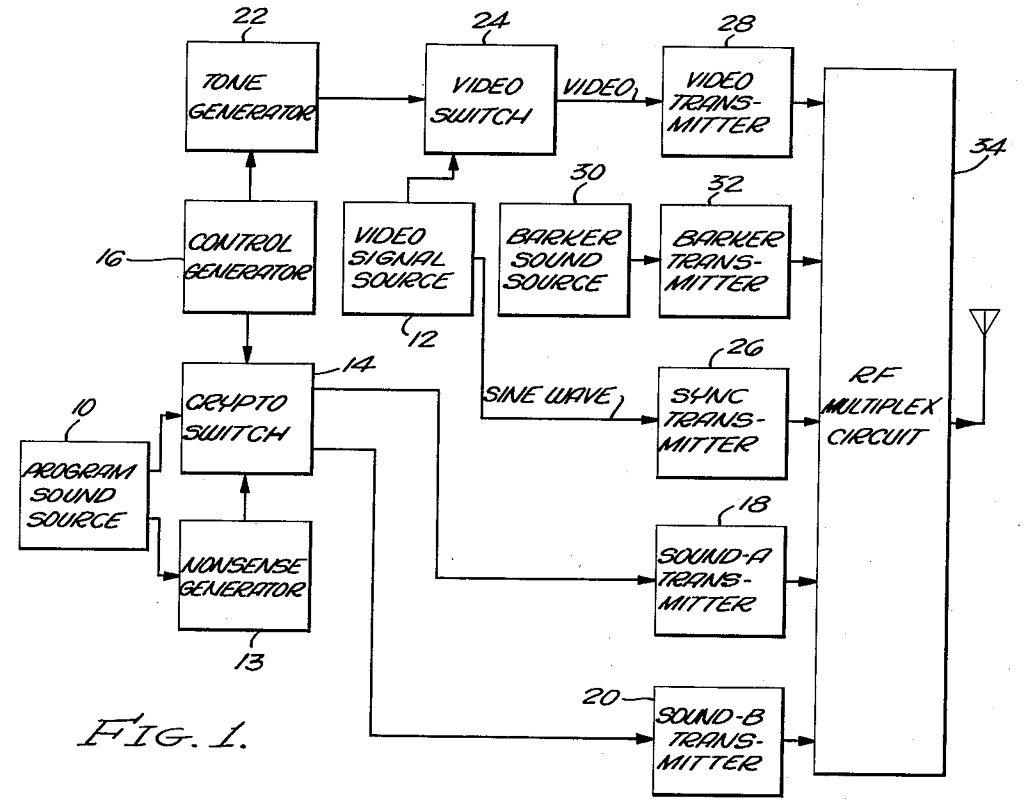
FIGURE 1 is a block diagram of a transmitter in accordance with this invention.

Reference is now made to FIGURE 1, which is for a simplified block diagram of the apparatus required for modifying a standard television transmitter in order that it may operate as a transmitter in a subscription television system in accordance with this invention. The television transmitter will have a program sound source 10 and a video signal source 12, which respectively represent the well-known arrangements for obtaining the sound and composite video signals at a television station. The output of the program sound source 10 is applied to a nonsense generator 13 and to a cryptographic switch 14. The nonsense generator 12 is described and claimed in an application to Abraham M. Reiter, for an Audio Nonsense Generator, Serial No. 731,286, filed April 28, 1958, and assigned to a common assignee.

The crytographic switch 14 is operated in response to a control generator 16. The output of the cryptographic switch 14 will be program sound and audio nonsense, which are applied to two separate channels. Each of these channels includes modulating apparatus, which puts these signals on suitable subcarriers. This modulating apparatus is respectively designated as sound A transmission 18 and sound B transmission 20. The cryptographic switch, in response to the control generator, operates to randomly interchange the application of program sound and nonsense generator to the two transmission channels. As a result, a "pirate" will receive intervals of very annoying sound from the nonsense generator interspersed with program audio intervals. The reason for this is that a pirate receiver, which is equipped with a single channel, will hear the portions of the program which are transmitted on that channel interspersed with audio nonsense transmitted on that channel. If a wide-band receiver is used, then an unintelligible sound is head. There is also transmitted barker audio, which is audio describing the price and virtues of the program which is to be seen. Only this is heard by a nonsubscriber. A subscriber will hear the barker until he has paid the required program cost. The arrangement for randomly switching the signals on the two transmission channels in response to the output of the control generator is described and claimed in an application by Phil H. Weiss for a Secrecy System, filed April 18, 1955, Serial No. 501,840.

The control generator 16 emits a signal indicative of the fact that it will perform the switching operation. This signal is applied to a tone generator 22, which generates tones for the purpose of instructing the receiver of a subscriber to follow the program transmission if he has paid. These tones are applied to a video switch 24. Also applied to the video switch is composite video from the video signal source 12. The function of the video switch 24 is to reduce the level of the horizontal blanking and synchronizing signals from the blank and infra-black levels of the video to a grey level of the video. The video switch also inserts the output of the tone generator, consisting of one or the other of two tones, in the composite video signal during the last three lines of a field.

A sine wave having a frequency of the horizontal sync signal, namely, 15.75 kc., is derived from the video signal source. The sine wave signal is amplitude-modulated on a subcarrier by a modulator. This function is represented by the rectangle 26, designated as sync transmitter. It is to be noted that this sine wave signal is to be employed at the receiver for reconstituting the horizontal sync signal in the composite video while it is still modulated on its RF carrier. Signals having other than a sine wave shape may be transmitted for subsequent use in reconstituting at the receiver. However, the sine wave is a preferred signal, since it occupies a minimum of bandwidth. The output of the video switch 24 is applied to a video transmitter 28. This will amplitude-modulate the video on a carrier in the customary and well-known manner. A barker audio generated at a barker sound source 30 may be applied to a barker transmitter 32, to be frequency modulated on a subcarrier. The barker signal takes the place of the usual audio signals accompanying video signals. The barker comprises a verbal description of the merits of the program which is to be transmitted—also, its price and other pertinent data.

The outputs of the video transmitter, barker transmitter, sync transmitter, sound A transmitter, and sound B transmitter are all multiplexed on a carrier by an RF multiplex circuit 34. The output of the RF multiplex circuit is applied to the antenna of the television transmitter for transmission.

The location of the various signals being transmitted is as follows. The video carrier is the one usually employed with whatever video transmission channel is being used. The barker carrier is 4.5 mc. above the video carrier. The sine-wave carrier is 4.3 mc. above the video carrier. The program sound is positioned at 4.67 mc. above the video. The nonsense sound is positioned at 4.73 mc. above the video. The first audio tone is at 4.1 mc. within the video. The second tone is transmitted at 3.9 mc. within the video. The barker sound, reconstituting signal which here is 15.75 kc. sine wave, program sound, and nonsense sound are all amplitude-modulated on suitable carriers which will position the respective signals at the location with respect to the video previously given. Either tone 1 or tone 2 is sent every field as a burst in the video during the last three lines of vertical blanking.

Figure 2:
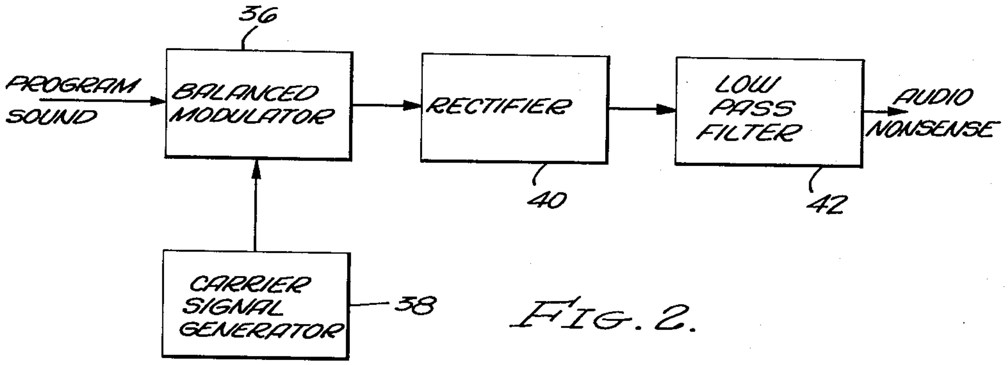
FIGURE 2 is a block diagram of a nonsense generator which is employed in the embodiment of the invention.

FIGURE 2 is a block diagram illustrative of a suitable nonsense generator such as the one described and claimed in the aforementioned application by Abraham M. Reiter. The audio nonsense generator includes a balanced modulator 36, to which there is applied program sound and a carrier signal from a carrier-signal generator 38. The frequency of this carrier signal is selected to be high when compared with the highest frequency of the program sound. A suitable frequency is one megacycle. The output of the balanced modulator will consist of a double-sideband suppressed-carrier signal. This is applied to a rectifier 40 and then to a low-pass filter 42. The low-pass filter has a pass band on the order of 20 kc. The output of the low-pass filter will consist of audio nonsense. The low-pass filter will reject all frequencies above the audio-frequency range. Its output will be principally second harmonics of the initial program sound signal. It is the output of the low-pass filter, as well as the program sound, which are applied to the cryptography switch 14 for subsequent random transmission over one or the other of two channels.

Figure 3:
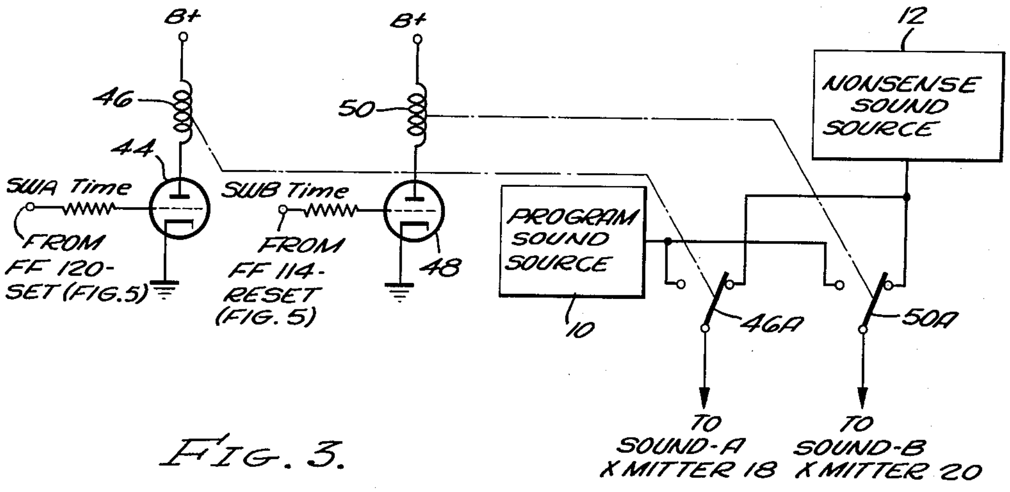
FIGURE 3 is a circuit diagram of an illustrative cryptography switch suitable for use in the embodiment of the invention.

Reference is now made to FIGURE 3, which is a circuit diagram of an illustrative cryptography switch suitable for use in the embodiment of the invention. This will include a first vacuum tube 44, which has a relay coil 46 in series with its plate. A second tube 48 has a second relay coil 50 in series with its plate. The signals applied to the respective grids of the tubes 44, 48 are designated as switch A time and switch B time. These are the signals derived from the control generator which render one, or the other, or both of these tubes conductive. The relay coil 46 has associated with its single-pole, double-throw contacts 46A. The relay coil 50 has associated with it single-pole, double-throw contacts 50A. The contacts are shown in the normal, or nonexcited, position of the relay. The nonsense sound source is connected to one of the contacts of each relay; the program-sound source 10 is connected to the other contact of each relay. Thus, should a switch A time signal be applied to tube 44, then contacts 46A apply program sound to the sound A transmitter 18, while contacts 50A apply nonsense sound to the sound B transmitter 20. If a switch B time signal is applied to the tube 48, enabling it to become conductive, then the relay coil 50 switches its contacts 50A so that program sound is applied to the sound B transmitter 20.

The instructions for switching are derived from apparatus represented by the rectangle 16, labeled "control generator." The control generator not only provides these switching signals, but also generates tones which are used to provide a receiver with the information required to follow the program switching at the transmitter. These tones also provide information for establishing or checking the cost of a program established at the receiver. The control generator contains a cyclic counter. From this is derived the signals for the audio cryptography, as well as the price-establishing signals at the receiver. A preferred counter, but not necessarily the only kind that can be employed, is a decade counter in the form of a beam-switching tube. This tube is a well-known commercially purchasable type wherein a single main anode may be surrounded by ten main, or output, cathodes and twenty intermediate guide cathodes. Two of these guide cathodes are located between every main cathode interval. By properly sequencing the application of a pulse to the guide cathode, a glow discharge can be made to move from cathode to cathode in a desired manner. The ten main cathodes are made externally available. The ten guide cathodes, which are used for stepping the glow discharge, are connected to two output terminals.

Figure 4:
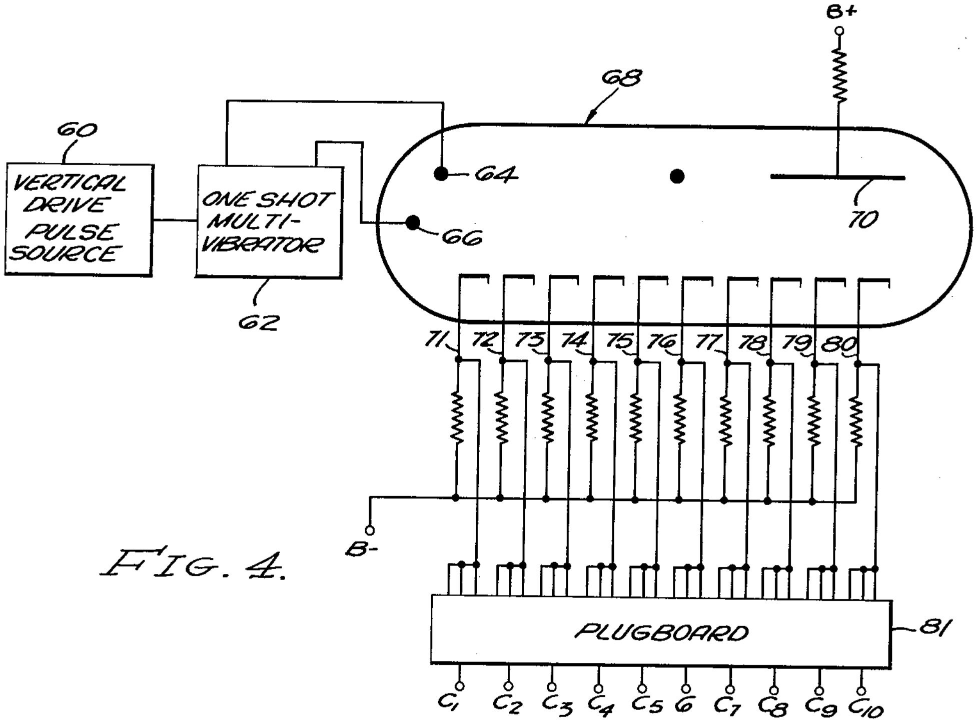
FIGURE 4 is a schematic of an arrangement for generating coding signals in accordance with this invention.

Referring now to FIGURE 4, there may be seen a part of the control generator which comprises an arrangement for generating coding signals in accordance with this invention. This includes a source of driving signals 60 which here are vertical-drive pulses generated at the transmitter. The output of the vertical-drive pulse source 60 is applied to a one-shot multivibrator 62. The one-shot multivibrator circuit is driven from a stable to an unstable state, and then after an interval determined by its time constant, returns to its stable state. Thereby, two output pulses are generated. These are applied to the two guide terminals 64, 66 of the glow-tube counter 68. Thus, the sequence of pulses from the one-shot multivibrator, in response to the vertical drive pulses, cause the glow discharge to exist successively between the anode 70 and each one of the ten main cathodes, respectively 71 to 80. The glow discharge is transferred from cathode 80 to cathode 71 again, and the cycle continues. The potential of the cathode at which a glow discharge occurs rises. Each cathode is connected to at least three jacks (not shown) in a plugboard 81. Output terminals C1 through C10 can be connected through plugs (not shown) to any one of the jacks in the plugboard 81. However, there are certain prescribed selections which must be made which will be described herein subsequently.

Figure 5:
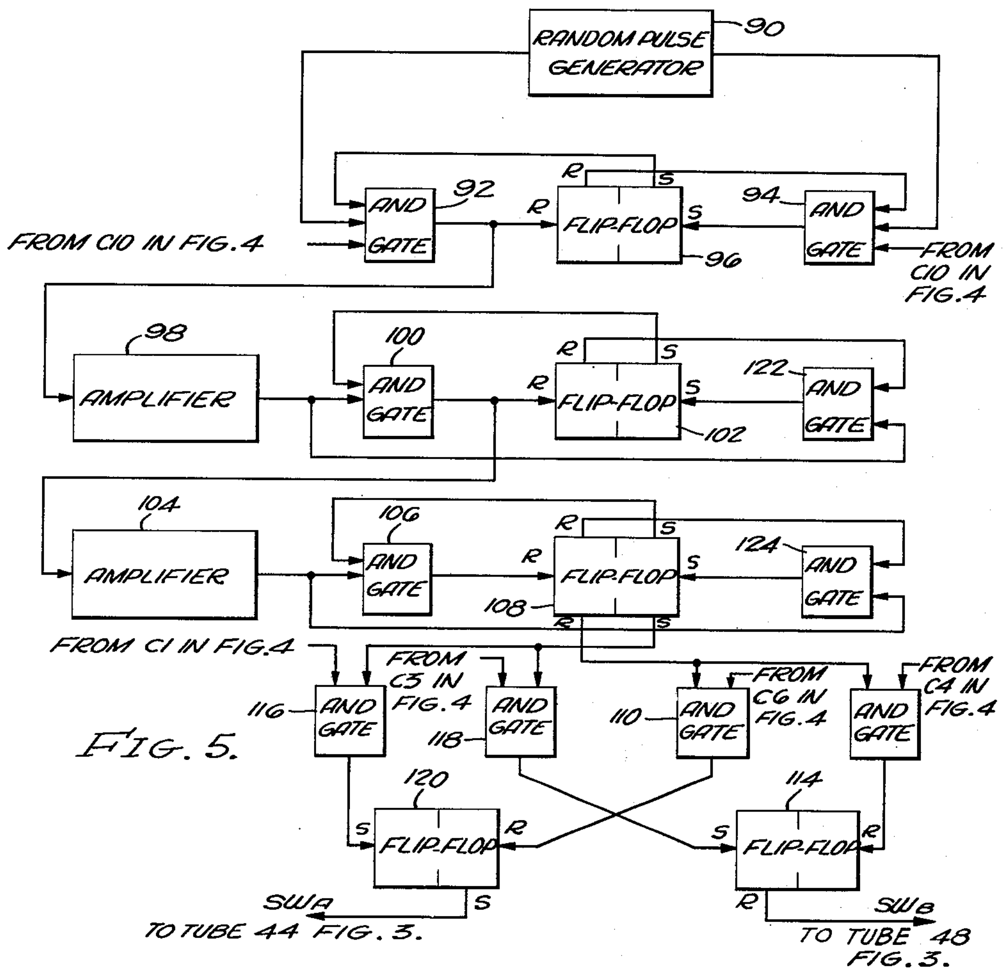
FIGURE 5 is a block diagram of logic required for generating the audio channel switching signals at the transmitter.

FIGURE 5 is a block diagram of a portion of the apparatus included in the code generator. FIGURE 5 is an arrangement for providing the switch A and switch B signals to the switch circuits shown in FIGURE 3. A random-pulse generator 90 applies its output to two three-input AND gates, respectively 92 and 94. The random-pulse generator may be any suitable source for generating an output pulse which has a random occurrence. These are well known in the art and may be, for example, a diode or a gas tube with a floating grid, the outputs of which are amplified. A second required input to AND gate 92 and to AND gate 94 is an output from terminal C10, shown in FIGURE 4. A third input to AND gate 92 is an output from a flip-flop 96 when in the set stable condition. A third required input to AND gate 94 is an output from flip-flop 96 when in its reset stable condition. The flip-flop circuit will be recognized as a well-known multivibrator circuit having two stable states, one of which may be designated as its set stable state and the other as its reset stable state. It can be driven from one to the other of its stable states by the application of a pulse input. These inputs are respectively designated by the letters "R" and "S," corresponding to the stable condition to which the flip-flop circuit will be driven when a pulse is applied to that input.

The output of AND gate 92, upon receiving the required three inputs, applies an output to drive the flip-flop 96 to its reset state and also applies an output to an amplifier 98. The amplifier 98 amplifies and inverts the output of the AND gate 92 and applies it to an AND gate 100. The second required input to AND gate 100 is an output from flip-flop 102 when in its set condition. The output of AND gate 100, upon receiving the required two inputs, is applied to reset flip-flop 102 and to an amplifier 104. This amplifier amplifies the input received from AND gate 100, inverts it, and applies it to an AND gate 106. The second required input to AND gate 106 is the set output of a flip-flop 108. AND gate 106 thereupon drives flip-flop 108 to its reset state. The output of flip-flop 108 in its reset state is applied to two AND gates 110, 112. A second required input to AND gate 112 is a signal received from the C4 terminal (shown in FIGURE 5), whereupon the AND gate can drive a flip-flop 114 to its reset condition. The reset output of flip-flop 114 provides a switch B signal to tube 48 in FIGURE 3. The set output of flip-flop 108 is applied to two AND gates 116, 118. A second required input to AND gate 116 is an output from the C1 terminal of the generator shown in FIGURE 4. A second required input for AND gate 118 is an output on the C3 terminal of the generator shown in FIGURE 4. AND gates 116 and 118, in the respective presence of inputs from terminals C1 and C3, respectively set flip-flop 120 and reset flip-flop 114, whereby a switch A signal is applied to tube 44 in FIGURE 3.

From the description which has been given thus far of the operation of the flip-flops 96, 102, and 108, and their associated AND gates, it should be appreciated that effectively what is provided is a three-stage binary counter with outputs being taken from the third stage for establishing upon which of the two transmission channels the program audio will be transmitted, leaving the other transmission channel for transmitting audio nonsense. The counter counts occur at random intervals, in view of the presence of the random-pulse generator. The output of flip-flops 120 and 114, respectively, are made to occur at C1 time and C4 time. These respectively indicate the commencement of an overlap interval during which a switching operation will occur. The actual switch at a receiver to the A channel will occur at the time an output is obtained on the C2 terminal, and a switch to the B channel will occur at a receiver at the time an output is obtained on the C5 terminal.

Figure 6:
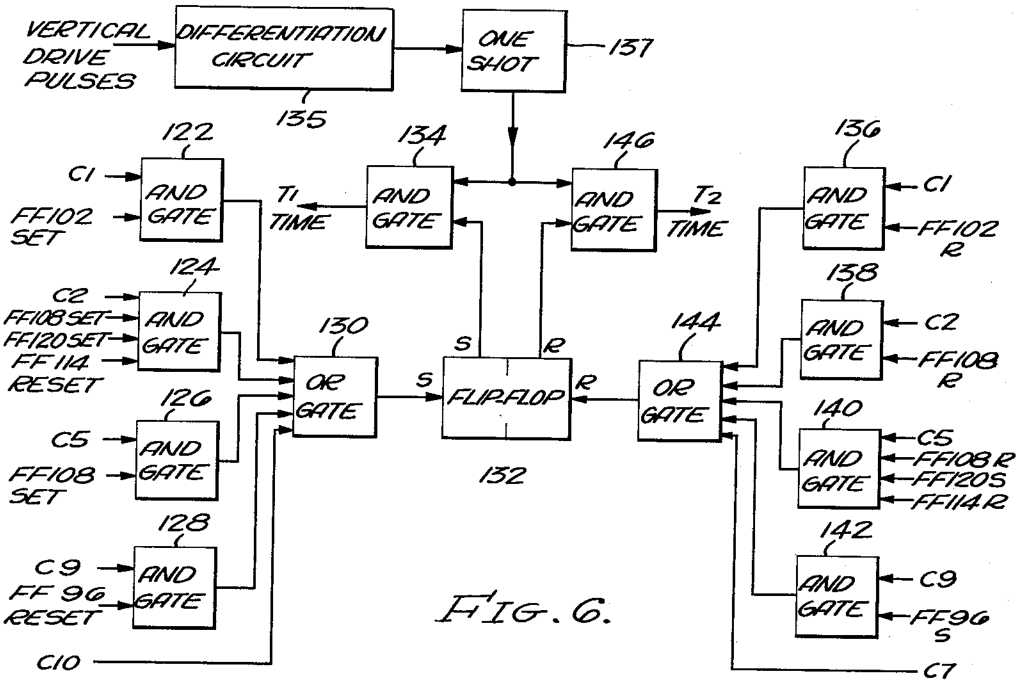
FIGURE 6 is a block diagram of the logic required for generating the tone information at the transmitter for instructing a receiver when to switch audio channels.

Referring now to FIGURE 6, there is shown a block diagram of the logical circuitry, which is part of the control generator, which generates signals indicative of the occurrence of audio channel switching and other cryptographic functions. These signals are applied to the tone generator 22 to cause it to provide tones in response thereto. Thus, FIGURE 6 shows a block diagram of the logic for indicating the time in which tones should appear for signaling audio channel switching instructions to the receiver and that the cost of the program to be viewed which has been set up at the receiver is in error. Four AND gates 122, 124, 126, 128 each applies its output to an OR gate 130. Also applied to the OR gate 130 is a signal whenever the C10 terminal in FIGURE 4 is energized. The input to AND gate 122, whereupon it provides an output, occurs upon the simultaneous occurrence of an output from the C1 terminal and flip-flop 102 being driven to its set condition. AND gate 124 will provide an output whenever it receives an input from the C2 contact terminal and flip-flops 108 and 120 are energized and flip-flops 108 and 114 be in their reset conditions and flip-flop 120 be in its set condition. AND gate 142 requires an input from the C9 terminal and that flip-flop 96 be in its set condition.

For convenience, Table I shows the count inputs to the circuitry shown in FIGURE 5, from $C10_1$ to $C10_{20}$. Adjacent the count inputs are shown the reset and set conditions (designated as R and S), which the flip-flops 96, 102, and 108 assume in response to successive inputs which occur at C10 time. Adjacent the table representing the conditions of flip-flops 96, 102, 108 are also shown those assumed by flip-flops 120 and 114. There is then also shown the tones which are selected in response to the operation of the logical circuits shown in FIGURES 5 and 6 as outputs obtained on terminals C1–C10. It should borne in mind that although the table presents C1 through C10 as if they occurred in sequence, this need not be the case. In view of the presence of the plugboard 81, outputs on C1 through C10 may be selected to occur in any desired sequence or pattern.

*Table I*

| Counts | 96 | 102 | 108 | SwA 120 | SwB 114 | C1 | C2 | C3 | C4 | C5 | C6 | C7 | C8 | C9 | C10 | |
|---|---|---|---|---|---|---|---|---|---|---|---|---|---|---|---|---|
| | R | R | R | R | R | | | | | | | | | | | |
| $C10_1$ | S | R | R | R | R | $T_2$ | ------ | ------ | ------ | ------ | ------ | ------ | ------ | ------ | $T_1$ | |
| $C10_2$ | R | S | R | R | R | $T_1$ | $T_2$ | ------ | ------ | ------ | ------ | ------ | ------ | $T_1$ | $T_1$ | |
| $C10_3$ | S | S | R | R | R | $T_1$ | $T_2$ | ------ | ------ | ------ | ------ | ------ | ------ | ------ | $T_1$ | Start |
| $C10_4$ | R | R | S | $C1_s$ | $C3_s$ | $T_2$ | $T_1$ | ------ | ------ | ------ | ------ | $T_2$ | ------ | $T_1$ | $T_1$ | SwA |
| $C10_5$ | S | R | S | S | S | $T_2$ | ------ | ------ | ------ | $T_1$ | ------ | $T_2$ | ------ | ------ | $T_1$ | |
| $C10_6$ | R | S | S | S | S | $T_1$ | ------ | ------ | ------ | ------ | ------ | $T_2$ | ------ | $T_1$ | $T_1$ | |
| $C10_7$ | S | S | S | S | S | $T_1$ | ------ | ------ | ------ | ------ | ------ | $T_2$ | ------ | ------ | $T_1$ | Start |
| $C10_8$ | R | R | R | $C6_R$ | $C4_R$ | $T_2$ | ------ | ------ | ------ | $T_2$ | ------ | ------ | ------ | $T_1$ | $T_1$ | SwB |
| $C10_9$ | S | R | R | R | R | $T_2$ | ------ | ------ | ------ | ------ | ------ | ------ | ------ | ------ | $T_1$ | |
| $C10_{10}$ | R | S | R | R | R | $T_1$ | $T_2$ | ------ | ------ | ------ | ------ | ------ | ------ | $T_1$ | $T_1$ | |
| $C10_{11}$ | S | S | R | R | R | $T_1$ | $T_2$ | ------ | ------ | ------ | ------ | $T_2$ | ------ | ------ | $T_1$ | SwA |
| $C10_{12}$ | R | R | S | $C1_s$ | $C2_s$ | $T_2$ | $T_1$ | ------ | ------ | $T_1$ | ------ | $T_2$ | ------ | $T_1$ | $T_1$ | |
| $C10_{13}$ | S | R | S | S | S | $T_2$ | ------ | ------ | ------ | ------ | ------ | $T_2$ | ------ | ------ | $T_1$ | |
| $C10_{14}$ | R | S | S | S | S | $T_1$ | ------ | ------ | ------ | ------ | ------ | $T_2$ | ------ | $T_1$ | $T_1$ | |
| $C10_{15}$ | S | S | S | S | S | $T_1$ | ------ | ------ | ------ | $T_2$ | ------ | ------ | ------ | ------ | $T_1$ | SwB |
| $C10_{16}$ | R | R | R | $C6_R$ | $C4_R$ | $T_2$ | ------ | ------ | ------ | ------ | ------ | ------ | ------ | $T_1$ | $T_1$ | |
| $C10_{17}$ | S | R | R | R | R | $T_2$ | ------ | ------ | ------ | ------ | ------ | $T_2$ | ------ | ------ | $T_1$ | |
| $C10_{18}$ | R | S | R | R | R | $T_1$ | ------ | ------ | ------ | ------ | ------ | ------ | ------ | $T_1$ | $T_1$ | |
| $C10_{19}$ | S | S | R | R | R | $T_1$ | $T_2$ | ------ | ------ | ------ | ------ | $T_2$ | ------ | ------ | $T_1$ | |
| $C10_{20}$ | R | R | S | $C1_s$ | $C3_s$ | $T_2$ | $T_1$ | ------ | ------ | ------ | ------ | ------ | ------ | $T_1$ | $T_1$ | |

in their set conditions and flip-flop 114 is in its reset condition. AND gate 126 provides an output to the succeeding OR gate 130 whenever its input is energized by an output from flip-flop 108 in its set condition and terminal C5 is energized. AND gate 128 requires as an input an energization from terminal C8 and that flip-flop 96 be in its reset condition.

The output of OR gate 130 is applied to a flip-flop 132 and drives it to its set condition. The set condition of flip-flop 132 is applied to an AND gate 134. Vertical drive pulses are applied to a differentiation circuit 135 which, in response, generates a pulse for the trailing and leading edge of each pulse. The one-shot multivibrator 137 is tripped by the output of the differentiation circuit and provides an output to AND gates 134 and 146, lasting for the last three lines of a picture field. AND gate 134, in the presence of the set output of flip-flop 132 and also having applied thereto the output of the one-shot multivibrator 137, signals to circuitry to be shown herein subsequently that a T1 tone should be transmitted.

Another set of four AND gates 136, 138, 140, 142 respectively apply their outputs to an OR gate 144. Also applied as an input to OR gate 144 is an output from the C7 terminal. The output of OR gate 144 resets flip-flop 132, whereupon, upon the occurrence of output from one-shot 137, AND gate 146 emits an output during the last three lines of a field to signal the fact that a T2 tone should be generated and transmitted.

Figure 7:
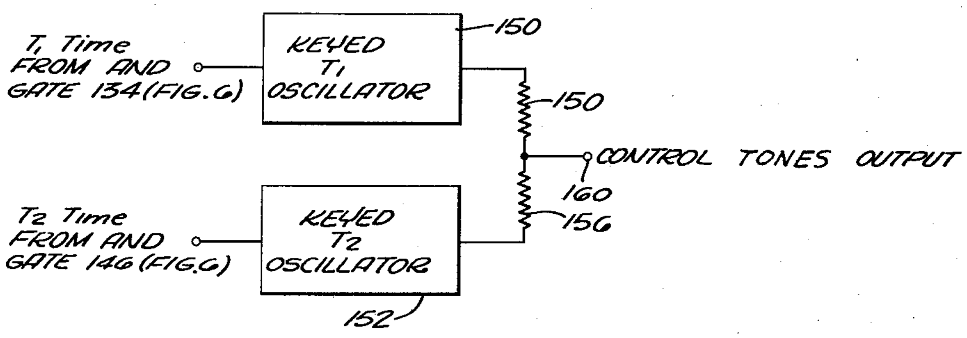
FIGURE 7 is a block diagram of a tone generator required at the transmitter in the embodiment of the invention.

AND gate 136 requires as an input an energization from a C1 terminal and that flip-flop 102 be in its reset condition. AND gate 138 requires as an input a C2 terminal signal and that flip-flop 108 be in its reset condition. AND gate 140 requires that C5 terminal be FIGURE 7 is a block diagram of the arrangement for utilizing the outputs of the AND gates 134 and 146 for providing tones T1 and T2 for transmission. The output of AND gate 134 is applied to a keyed oscillator 150, which oscillates at the T1 frequency, which is 900 kc. The output of AND gate 146 is applied to a keyed T2 oscillator 152, which oscillates at a frequency of 1100 kc. The keyed oscillators only emit oscillations when they receive an output from the respective AND gates 134, 146. The arrangement is well known in the art, comprising merely an oscillator wherein the oscillator is biased off unless an input signal is received. The outputs of the two keyed oscillators are added by means of resistors 154 and 156 and applied to an output terminal 160.

Thus far, there has been described an arrangement for randomly switching the program audio for coding. The code generator controls the times of such switching and also enables tones to be generated, whereby the times of such switching, as well as other information, may be signaled to the receiver. These tone signals are transmitted as a burst during the last three lines of the vertical-blanking interval. It was also previously pointed out that the composite video signal is transmitted with the horizontal blanking and synchronizing signals replaced by a pulse having its maximum amplitude in the grey-level region of the video. To perform the required alteration in the composite video signal, it is necessary to generate certain "operational signals," such as horizontal gate signals, which comprise pulses derived from sine waves at the horizontal sync frequency and also "key" signals, which is the name applied to pulses which occur during the backporch interval of the horizontal-blanking pulse.

Figure 8:
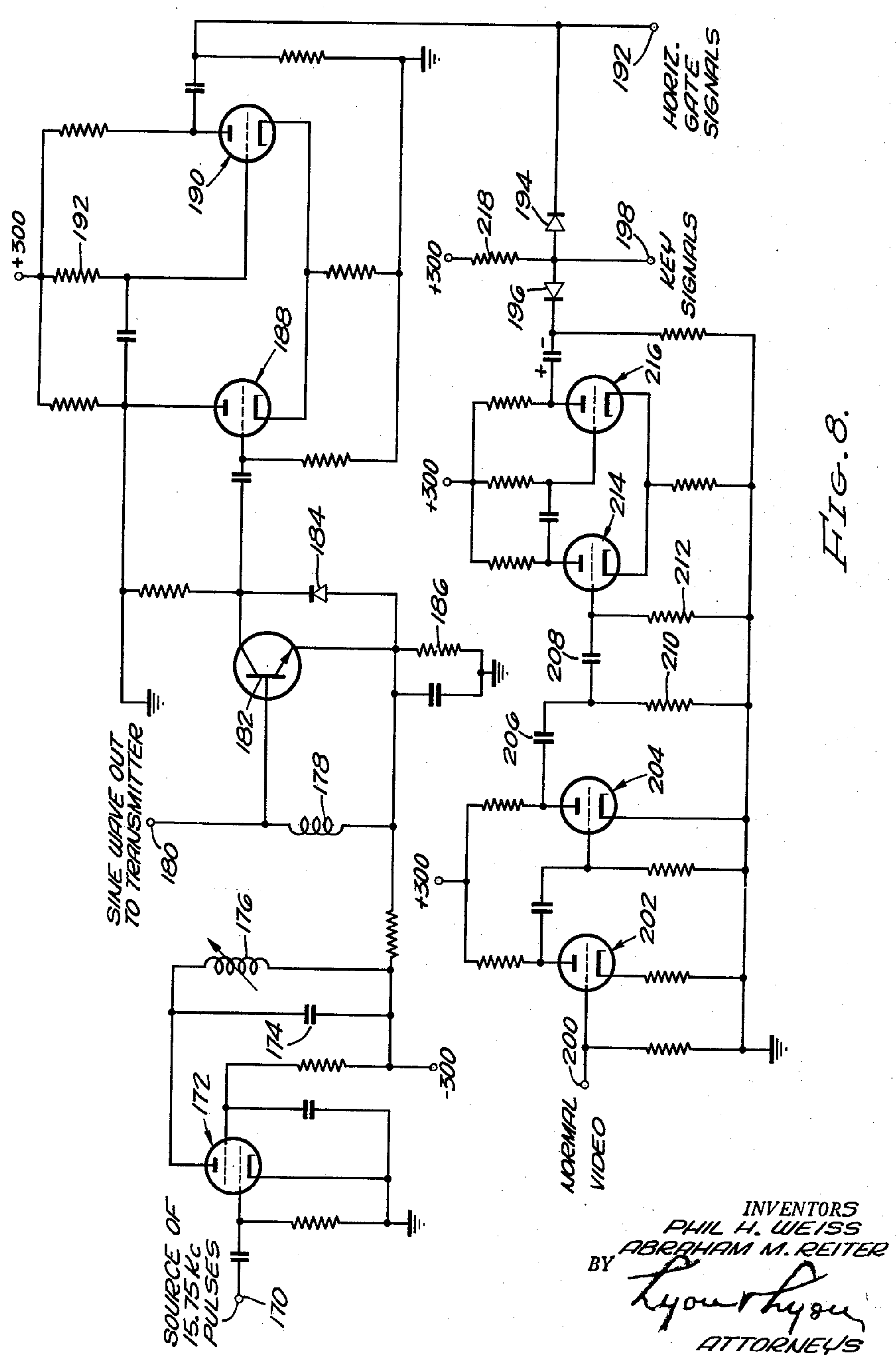
FIGURE 8 is a circuit diagram of the operational signal generator required at the transmitter in the embodiment of the invention.

A circuit diagram for generating the "operational signals" is shown in FIGURE 8. The synchronizing-signal generator at the transmitter generates pulses having a frequency of 15.75 kc. These are applied to a terminal 170, which is coupled to the grid of a tube 172. The tube 172 has a resonant tank, or flywheel, circuit connected to its plate comprising a parallel-tuned condenser 174 and a variable inductance 176. The flywheel circuit is excited by tube 172, and, due to the flywheel effect, provides sine waves at the frequency of the input pulses. These sine waves are coupled via the coil 178 to an output terminal 180 and to the base of a transistor 182. Terminal 180 is connected to the sync sine-wave transmitter 26 (FIGURE 1). The collector of the transistor 182 is coupled to the emitter via a diode 184. The diode is poled in a manner so that it bypasses negative halves of the sine wave to ground through a low-value resistor 186. Positive halves of the sine wave are applied from the collector of the transistor 182 to the grid of a tube 188.

Tube 188 and tube 190 are connected together to form a one-shot multivibrator. In the quiescent state, tube 190 is conducting and maintains tube 188 cut off via the common-cathode coupling. Upon receiving a positive input, tube 188 is rendered conductive. It applies a negative signal to tube 190 grid and a positive signal to its cathode. After a time determined by the value of the circuit components, the tubes are restored to their quiescent state again. The output of tube 190 comprises the horizontal gate signals, which are pulses having a width which is substantially 11 microseconds and which overlaps the horizontal-blanking interval. These pulses are applied to a terminal 192 and also to a diode 194, which comprises one-half of an AND gate, which includes another diode 196. The output of this AND gate is applied to a terminal 198 and, as will be shown by the subsequent description, comprises the key signals.

Normal composite video signals are applied to an input terminal 200. This is connected to the grid of a tube 202, the output of which is applied to a tube 204. These tubes are biased so that they will not pass the video-signal portion of the composite video signal applied to their inputs, but only the sync signal portion. These tubes, in conjunction with the high-pass filter to which the output of tube 204 is applied, provides the well-known function of stripping the horizontal sync signals from the composite video. The high-pass filter comprises series condensers 206, 208 and shunt resistors 210, 212. The output of the high-pass filter is applied to two tubes 214, 216, which are connected in a one-shot multivibrator circuit configuration which is substantially identical with that in which tubes 188 and 190 are connected. The component values selected for this one-shot multivibrator circuit are such that, in response to the horizontal sync signal input, it provides an output pulse occurring during the backporch interval. This output is applied to the diode 196. The polarity of the signals applied respectively to diodes 196 and 194 from tubes 216 and 190 is such as to block conduction through these diodes when these signals are present. In the absence of these signals, the current flow occurs through these diodes from a +300 volt source through the 330-ohm resistor 218. Thus, the potential at the output key terminal 198 cannot rise to substantially the 300-volt level unless conduction is cut off in both diodes 194 and 196. It was pointed out previously that the inductance 176 in the plate circuit of tube 172 was made variable. The reason for this is to enable the positioning of the horizontal gate signal so that it will overlap the horizontal-blanking signal. With this adjustment being made, an output is derived at the key terminal 198 only during the backporch interval for each line. The AND gate is employed for eliminating any key signals that might be generated during the blanking interval in response to equalizing pulses.

Figure 9:
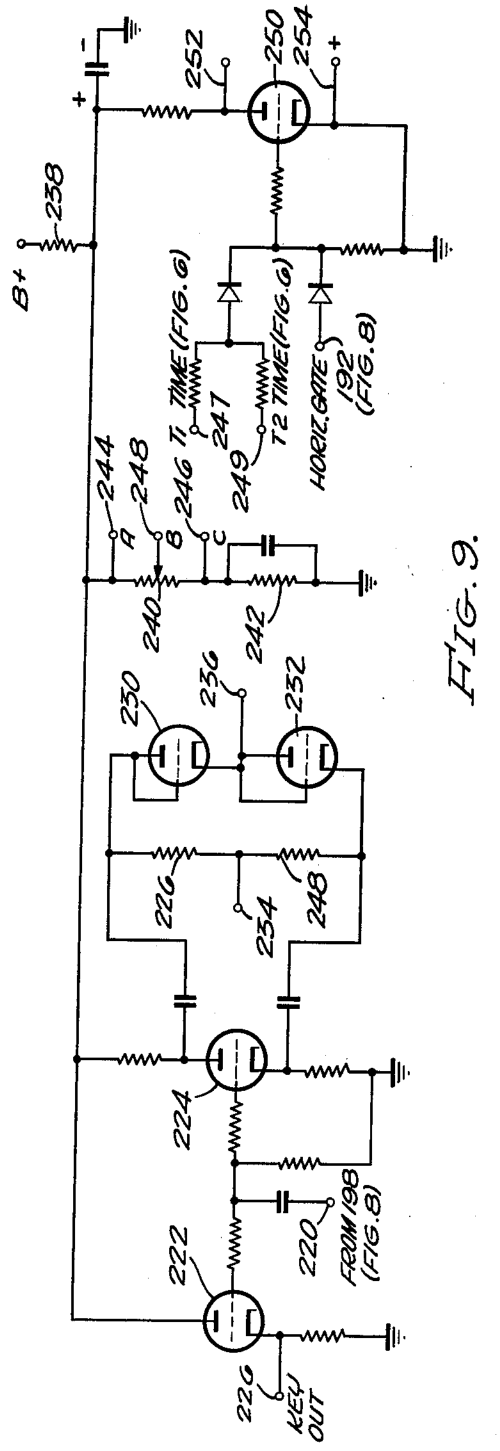
FIGURE 9 is a circuit diagram of apparatus for generating additional operational signals required at the transmitter in accordance with this invention.

FIGURE 9 is a circuit diagram of apparatus for generating additional operational signals which are required at the transmitter in order that it may operate in accordance with this invention. The key signals which are derived at the key output terminal 198 in FIGURE 8 are applied to an input terminal 220 in FIGURE 9. The input terminal is connected to the control grid of two tubes 222 and 224. Tube 222 is a cathode-follower tube which provides key output signals at a terminal 226. Tube 224 is phase-inverter connected, whereby out-of-phase outputs are simultaneously derived from its cathode and anode. These two outputs are applied to the opposite terminals of a bridge comprising two resistors 226, 228, connected in series and across two triode tubes 230, 232, which are connected in series. These tubes have their control grids connected to their anodes to provide diode operation. The junction of the two resistors 226, 228 is connected to an output terminal 234, and the output from the junction of the two tubes 230, 232 is connected to an output terminal 236. The signals provided at these two terminals are employed for line-clamping purposes.

Bias operational signals are derived from a voltage divider which includes a resistor 238, a potentiometer 240, and a third resistor 242, all of which are connected in series between the operating potential source and ground. The junction of resistor 238 and potentiometer 240 is brought out to a terminal 244. The movable arm of the potentiometer 240 is brought out to a terminal 248. The junction between the potentiometer and resistor 242 is brought out to a terminal 246.

The transmitter requires blanking signals during T1 and T2 time and during the horizontal-blanking interval. T1 and T2 time signals from FIGURE 6 are respectively applied to terminals 247 and 249. Horizontal gate signals are applied to terminal 192. These three signals are applied from the input terminals to the grid of a phase-inverter tube 250. Output of the anode of this tube, comprising negative-blanking signals, is applied to a terminal 252; output from the cathode of the tube, comprising positive-blanking signals, is applied to an output terminal 254.

Figure 10:
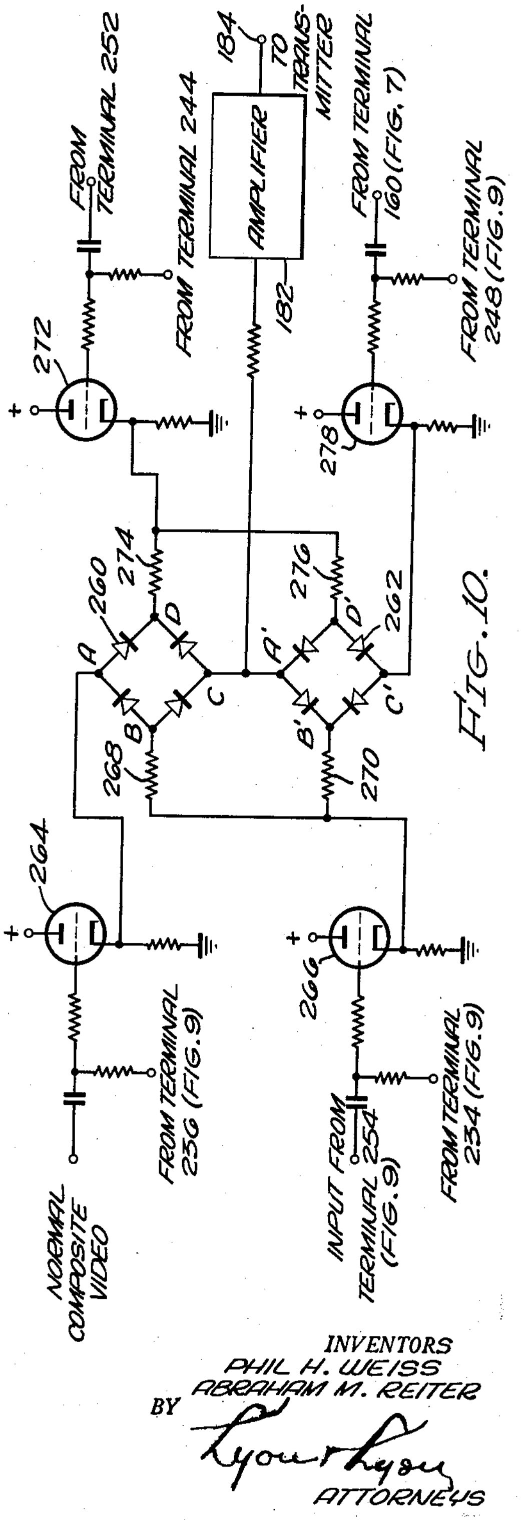
FIGURE 10 is a circuit diagram of apparatus for providing coded video including tone signals.

The operational signals which have been described are applied to the circuitry shown in FIGURE 10, which is a circuit diagram of apparatus for generating the coded video having grey-level sync signals and also having the tone signals inserted during the last three lines of each field. The structure includes a pair of rectifier bridges 260, 262. The upper rectifier bridge 260 has four terminals, respectively designated as A, B, C, and D. The lower rectifier bridge 262 has four terminals, respectively designated as A′, B′, C′, and D′. Terminals C and A′ are joined together to provide an output terminal. The other bridge terminals serve as input terminals. Normal composite video plus signals from terminal 236 in FIGURE 9 are applied to the grid of cathode-follower tube 264. The cathode of this tube is connected to terminal A of bridge 260. The positive-blanking signals derived from terminal 252 in FIGURE 9 plus signals derived from terminal 234 in FIGURE 9 are applied to a cathode-follower tube 266. The cathode of this tube is connected to terminals B and B′ of bridges 260 and 262 through two resistors 268 and 270, respectively.

The negative-blanking signals obtained at terminal 252 in FIGURE 9 and the potential obtained at terminal 244 in FIGURE 9 are both applied to a cathode-follower tube 272, the cathode of which is coupled to the respective D and D′ terminals of the bridges through resistors 274 and 276. The control tones which are obtained at terminal 160 in FIGURE 7 and a bias level which is obtained from terminal 248 in FIGURE 9 are both applied to the cathode-follower tube 278, the cathode of which is coupled to terminal C′ of the diode bridge 262.

In the absence of blanking signals from tube 250, the bias voltages applied to the tubes 266 and 272 are such as to enable the video-signal portion of the composite video being applied to the bridges to pass through the bridges and to be applied to an amplifier 182, and thereafter to an output terminal 184 which may be designated as the coded-video output terminal. In the presence of horizontal-gate blanking signals from tube 250, the effects of the bias applied to tubes 266 and 272 are overcome, and those portions of the diode bridges through which the video signal can pass are blocked. The only bridge output which is obtained is D.C. level, which is the value of the voltage applied to bridge terminal C′ from the cathode of tube 278. This level is established by means of the potentiometer 240 in FIGURE 9. The value is that of the grey level of the video signals. Thus, in the composite video which is obtained at the output terminal 184, in place of a horizontal-blanking pulse on top of which is positioned the horizontal sync pulse, there is substituted a grey-level value pulse.

It was previously described in connection with FIGURE 6 that T1 and T2 times occur during the last three lines of a field. Thus, a T1 or T2 time blanking signal is provided during the last three lines of the field. Since at that time whichever one of the two tones has been selected by the code generator is applied to tube 278, this is inserted into the composite video and will be found in the output signal at terminal 184. The coded-video output is thereafter applied to the customary carrier modulator and after that multiplexed with the other signals for transmission in the manner described previously.

Figures 11, 12:
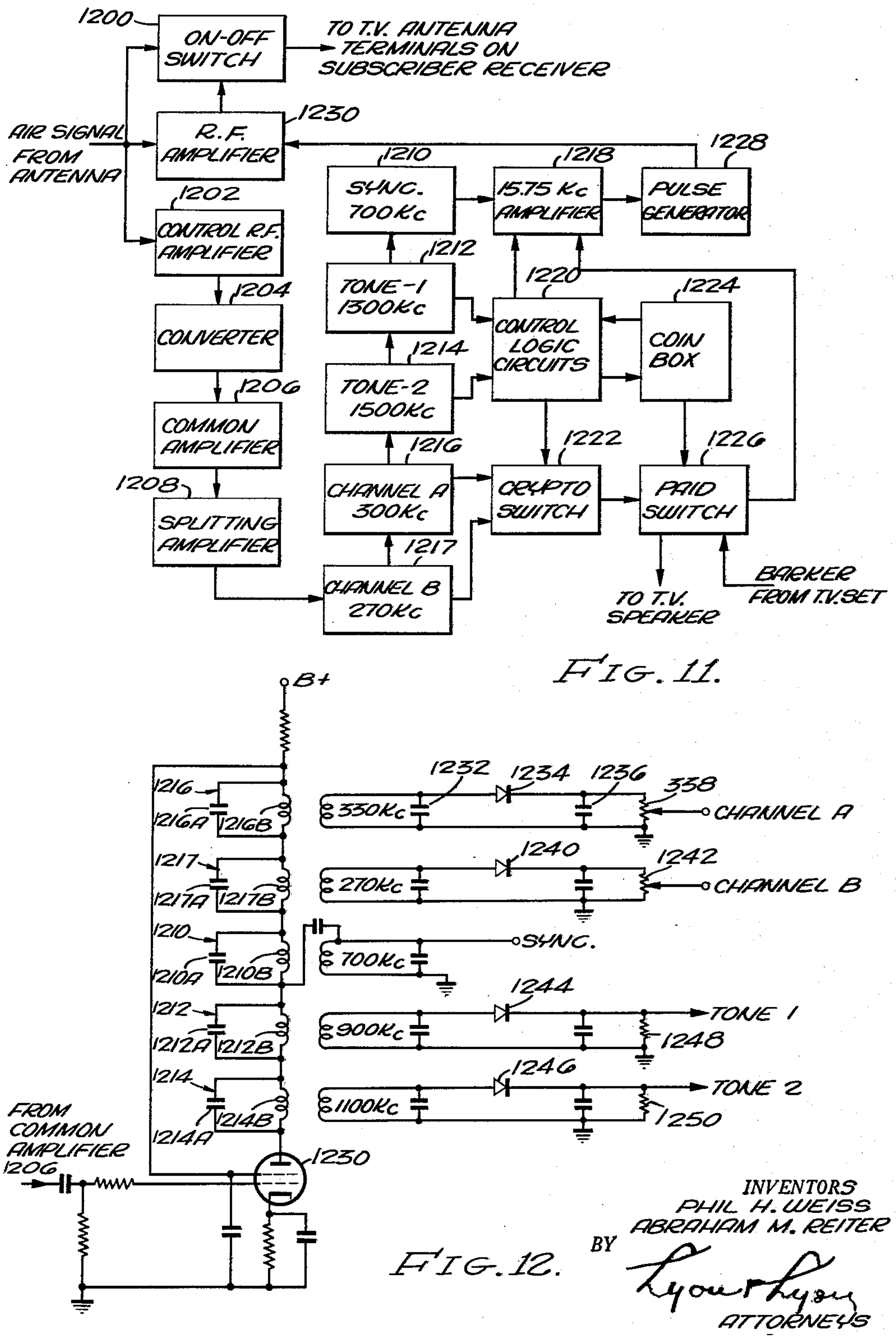
FIGURE 11 is a block diagram of a receiver attachment in accordance with this invention.
FIGURE 12 is a block diagram of a splitting amplifier employed at the receiver to separate the received transmitted signals.

FIGURE 11 is a block diagram of an attachment for a receiver in accordance with this invention. This will include a connection from the antenna normally used at the subscriber receiver to an on-off switch 1200. This switch is employed to connect signals received on the antenna directly to the antenna terminals at the subscriber receiver when no subscription television program is being transmitted, or to connect the output of the attachment (consisting of output from an RF amplifier 1230) to the set antenna terminals when a subscription television program is desired to be purchased. Signals from the antenna are also applied to a control radio-frequency amplifier 1202, which serves the function of amplifying these and thereafter applying them to a converter 1204. The converter includes an oscillator which generates the proper frequency for heterodyning with the received signals to convert them to video RF signals, plus 5 mc. The output of the converter thereafter, consisting of this video RF plus 5 mc., is applied to a common amplifier 1206. This is the usual video amplifier.

The output of the common amplifier 1206 is applied to a splitting amplifier 1208, which has the function of enabling the different components of the incoming signal to be separated out. It does this by providing a tuned circuit for each different element in the signal to be obtained. These tuned circuits, the circuit for which is shown in FIGURE 12, are respectively the horizontal-sync tuned circuit 1210, the tone-1 tuned circuit 1212, the tone-2 tuned circuit 1214, the sound-channel-A tuned circuit 1216, and the sound-channel-B tuned circuit 1217. The respective sound-channel-A and sound-channel-B tuned circuits will be recognized as corresponding to circuits which derive their intelligence respectively from transmission channel A and transmission channel B. The horizontal-sync tuned-circuit output is applied to a 15.75 kc. amplifier. The tone-1 and tone-2 tuned circuit outputs are applied to control logic circuits 1220. The sound-channel-A and sound-channel-B tuned circuit outputs are applied to a cryptographic switch arrangement 1222. The coinbox 1224, when the price established therein is paid, either by actual deposit of cash or by the pushing of a button signifying the intention to purchase which makes a recording as a result, enables a paid switch 1226 to be operated. This paid switch connects the output of the cryptographic switch 1222 into the TV receiver speaker, instead of barker audio signals. It also enables the 15.75 kc. amplifier 1218 to apply output to a pulse generator 1228.

The pulse generator 1228 performs the function of shaping the reconstructing signal input which in the preferred embodiment are sine waves into pulses. These are inserted in the proper position in the composite video signal while still modulated on its carrier which is received by the radio-frequency amplifier 1230 from the antenna. Such insertion is done simply by increasing the gain of the radio-frequency amplifier 1230 in response to each pulse. The increase in gain is sufficient to increase the amplitude of a grey-level signal, which was inserted at the transmitter in place of the horizontal sync and blanking pulse, until it can provide horizontal synchronization and sufficient blanking. Each reconstituting pulse occurs during the horizontal-blanking interval, and each reconstituting pulse width or duration is properly established by the pulse generator 1228 to establish a desired blanking pulse width. The effect of increasing the gain of the RF amplifier 1230 in response to the reconstituting pulse is to render the received video signal, while still modulated on its RF carrier, suitable for use by the following television receiver. The output of the video RF amplifier 1230 is thereafter applied to the television antenna terminals of the subscriber receiver. The signal then is handled exactly like any normal composite video signal which is received by the receiver.

FIGURE 12 is a circuit diagram of a suitable splitting amplifier which is employed at the receiver to separate the transmitter signals. The output of the common amplifier 1206 is applied to the control grid of the vacuum tube 1230. The tube 1230 has in its plate circuit five tuned-plate loads. These have the same reference numerals as are employed in FIGURE 11. Each tuned circuit, for example, tuned circuit 1210, includes a condenser 1210A, connected across the primary of a transformer 1210B. The condenser is selected to have a value to be resonant with the transformer at the desired resonant frequency. Thus, the secondary of the transformer 1210B will have as an output a 15.76 kc. sine wave modulated on a 700 kc. carrier. The output of the transformer 1212B will be the tone-1 frequency modulated on a 900 kc. carrier. The output of the transformer 1214B will be the tone-2 frequency modulated on an 1100 kc. carrier. The output of the channel-A transformer 1216B will be the sound which is being transmitted on channel-A modulated on a 330 kc. carrier. The output of channel-B transformer 1217B will be whatever sound is being transmitted on channel-B modulated on a 270 kc. carrier.

The respective tone-1, tone-2, channel-A and channel-B signals appearing on the outputs of their respective transformers are applied to filters for demodulation. For channel-A, the filter includes a first condenser 1232 in shunt with the secondary of the transformer 1216B. The rectifier 1234 is connected in series therewith, and the second shunt condenser 1236 is connected across the rectifier to the other side of the transformer secondary. A potentiometer 1238 is connected across the filter output and enables an adjustment of the sound level in the receiver. Channel-B filter circuit 1240 is identical with the filter circuit for channel-A. A potentiometer 1242 enables the adjustment of the sound-level output of channel-B. The tone-1 and tone-2 filter circuits 1244 and 1246 are identical with those found in channel-A and channel-B. The outputs of the respective filter circuits 1244 and 1246 are developed across resistors 1248 and 1250, respectively.

Figure 13:
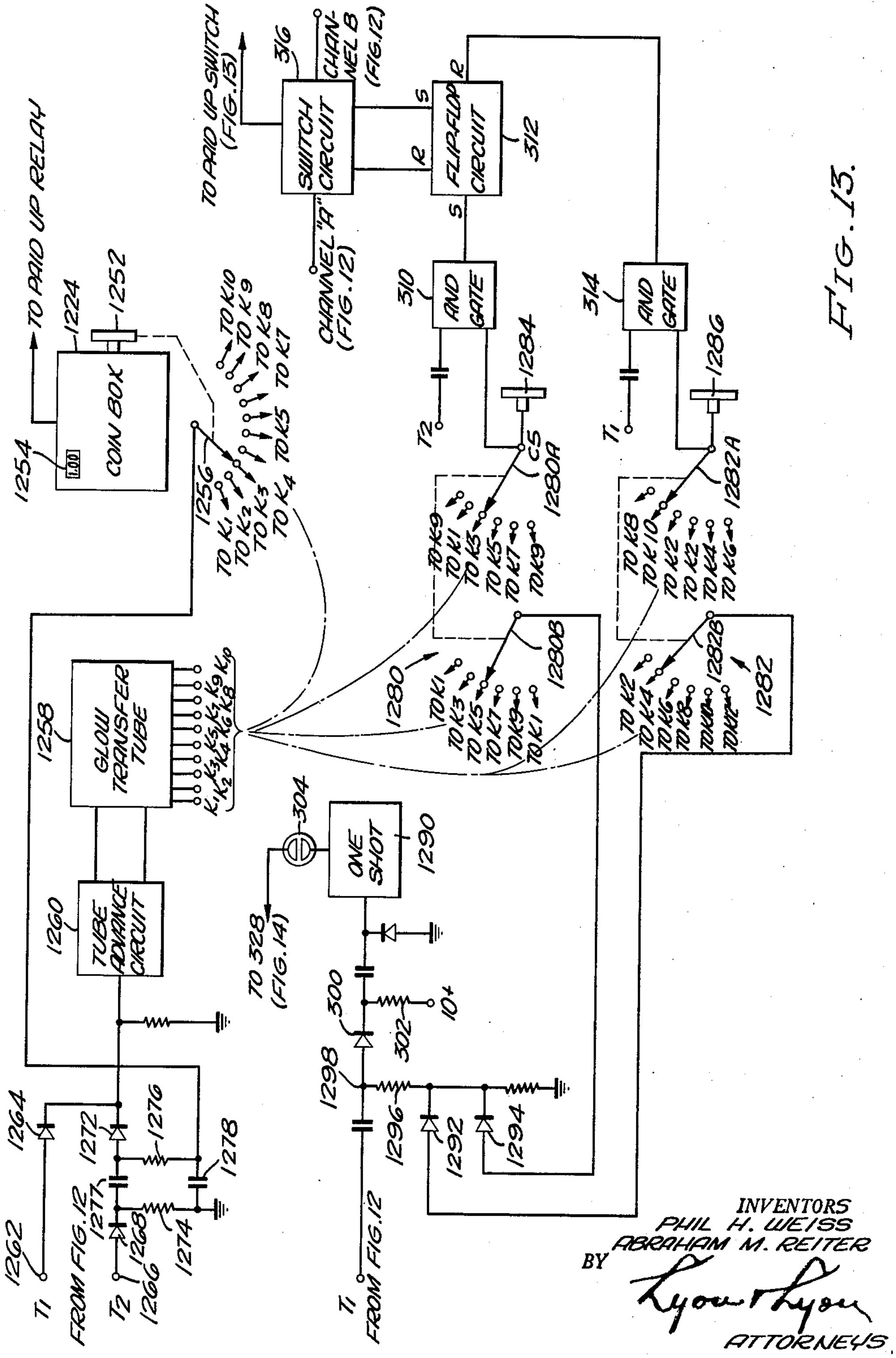
FIGURE 13 is a block diagram of the control logic and cryptography switch employed in a receiver in accordance with this invention.

FIGURE 13 provides further details of the control logic circuits 1220 and the cryptographic switch circuit 1222. The coinbox 1224 may be of any suitable type which has a handle 1252 which can be turned to enable the subscriber to set a price seen in a window 1254. An automatic coinbox is found, described and claimed in an application by John Nyberg, for Coinbox for Subscription Television, Serial No. 706,119, filed December 30, 1957, and assigned to a common assignee. The coinbox shown therein is one wherein the price is automatically established by signals from the transmitter which drive a solenoid. To modify that coinbox, it is merely necessary to provide a handle external to the coinbox whereby the price-indicating wheel can be turned from outside the cover by hand, instead of by a solenoid.

The subscriber is informed as to the price for viewing the program to be performed. This information comes either over the air via the barker sound or through other sources, such as newspapers. The subscriber adjusts the handle 1252 until the proper price is shown in the window 1254. Simultaneously, a selector switch 1256 which is coupled to the coinbox is adjusted. Each one of the contacts on the selector switch is connected to a different one of the cathodes K1 through K10 of a glow-transfer tube 1258. The glow-transfer tube is driven from a tube-advance circuit 1260, which is identical with the one-shot multivibrator circuit previously shown at the transmitter. The tube-advance circuit 1260 is a one-shot multivibrator. It is driven each time a T1 tone is received from the filter shown in FIGURE 12. The T1 tone is applied to a terminal 1262, which is connected to the tube-advance circuit through a rectifier 1264.

The glow-transfer tube 1258 may also be driven when a T2 tone is applied from the filter circuit 1250 in FIGURE 12 to a terminal 1266. However, whenever the arm of the selector switch 1256 is connected to an excited cathode of the glow-transfer tube, the T2 tone cannot advance the glow-transfer tube. This is accomplished by the use of an inhibiting arrangement. The T2 tone is applied to a rectifier 1268, which is connected in series with a condenser 1270, and a second rectifier 1272. A first resistor 1274 is connected between the first rectifier 1268 and ground. A second resistor 1276 is connected through a condenser 1278 from the second rectifier 1272 to ground. The cathode of the glow-transfer tube, at which an arc exists, is positive and, as a result, rectifier 1268 is blocked whenever the selector switch 1256 connects a positive signal from the selected cathode to the circuit including the rectifier 1268 and 1270. Thus, should the glow-transfer tube 1258 not be at the identical counting position with the glow-transfer tube in the transmitter, it will lose counts until it assumes the identical count as the glow tube at the transmitter. Thereafter, it will remain synchronized, and at the identical count position.

However, the glow-transfer tube can only remain in the identical count position if the coinbox has been established at the proper price. If it has not, then the glow-transfer tube 1258 will lose a count when it should not and go out of identical-count-condition state again. Thus, this arrangement provides a means of checking or establishing the price set by the subscriber to make sure that it is correct. It will be appreciated that it is required that a T1 tone be selected at the transmitter at whatever count of the transmitter glow-discharge tube counter is selected to represent the price to be asked for the program, since it is at that count at the receiver that a cathode of the glow tube is connected to inhibit the count unless a T1 tone is received. The plugboard 81 (FIGURE 4) in conjunction with the logic in FIGURE 6 provides the required selecting structure at the transmitter. It should be noted that although the coinbox 1224 has been described as being a manually settable one, it is within the scope of this invention to have a coinbox with the price automatically established therein, and the correctness of the price established may be checked in the manner to be described. The subscriber still has no way of knowing whether or not he has established the correct price in the coinbox. The subsequently described circuitry provides the subscriber with this information.

Two selector switches 1280, 1282 are employed; the selector switches 1280 and 1282 both have two decks, each one including a first and second selector arm, respectively 1280A, 1280B, 1282A, 1282B. The position of the selector arms 1280A and 1280B is manually establishable by means of a knob 1284, and a knob 1286 also enables the manual establishment of the selector arms 1282A and 1282B. The contacts of the deck to which the selector switch arm 1280A is connected are respectively connected to cathodes K9, K1, K3, K5, K7, and K9 again. The terminals on the deck to which the selector arm 1280B is connected respectively are connected to cathodes K1, K3, K5, K7, K9, and K1 again. The selector switch arm 1282A has the terminals on its deck connected to cathodes K8, K10, K2, K2, K4, and K6. Selector switch arm 1282B has the terminals on its deck connected to cathodes K2, K4, K6, K8, K10, and K2.

Selector switches 1280 and 1282 are also manually set by the subscriber to a position for which information is received over the air via the barker or through the newspapers.

Selector switch arms 1280B and 1282B are connected in an OR gate arrangement including diodes 1292 and 1294 through a resistor 1296 to a junction point 1298, to which a T1 tone is applied from the output of the filter in FIGURE 12. The rectifier 300 is maintained cut off by a source of positive potential which is applied to the resistor 302 connected to the cathode of the rectifier 300. In order to enable the rectifier 300 to be conductive to drive the succeeding one-shot 1290, an output from the glow-transfer tube plus the T1 tone must be added. The programming at the transmitter is such that a T2 tone will occur whenever the glow-transfer tube 1258 (if properly in count synchronism with that at the transmitter) has reached the count conditions to which the selector switches 1282B and 1280B have been set. Thereby, the one-shot 1290 will not be driven and will not excite the neon glow tube 304. However, should the glow-transfer tube 1258 be out of count synchronism, then the glow tube 304 will glow one or more times within a count cycle of the glow-transfer tube 1258, which will serve as a warning to the subscriber, either that he has established the wrong price in the coinbox or that the selector switches 1280, 1282 have been set at the wrong numbers. He then rechecks these.

A further indication to the subscriber that he has not properly set up the selector switches 1280, 1282 is provided by the switching between channel A and channel B of the receiver to follow the barker audio. Selector arm 1280A and the output of the T2 filter circuit in FIGURE 12 are connected to an AND gate 310. Thus, whenever the glow-transfer tube 1258 attains the count condition indicated by the cathode to which selector arm 1280A is connected and upon the simultaneous occurrence of a T2 tone, the output of AND gate 310 is applied to a flip-flop circuit 312 to drive it to its set condition. A similar arrangement is provided for the selector switch arm 1282A, which is connected to an AND gate 314, to which there is also connected the output of the T1 tone filter circuit in FIGURE 12. AND gate 314 will reset the flip-flop 312. An electronic switch circuit 316 is driven by the output of the flip-flop circuit to pass to its output either the input from the channel-A filter in FIGURE 12 or the input from the channel-B filter in FIGURE 12. The electronic switch circuit 316 may be any suitable two-channel-to-a-single-output switching arrangement. A preferred arrangement is shown, described, and claimed in an application by this inventor for Electronic Switch, Serial No. 590,608, filed June 11, 1956.

Figure 14:
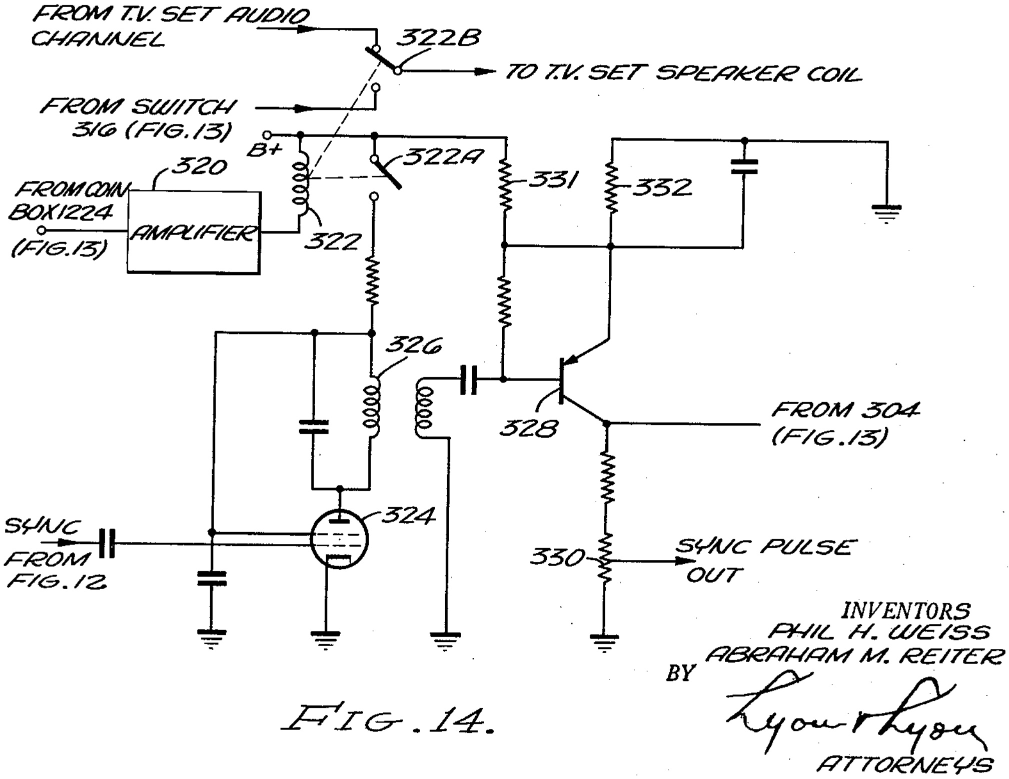
FIGURE 14 is a block diagram of the paid-up switch and the circuitry controlled by it.

FIGURE 14 is a circuit diagram of the paid-up switch and the circuitry it controls. The output of the coinbox 1224 is applied to an amplifier 320. When the coin demanded for viewing a program has been deposited, the coinbox will energize the amplifier 320, the output of which energizes a relay 322. This relay has a first contact pair 322A, which is employed to enable B+ to be applied to a pulse-forming amplifier 324. The output of the sync filter circuit shown in FIGURE 12 is applied to the grid of the tube 324. The tube and its associated pulse-forming circuitry 326 provides reconstituting pulses of the required width and frequency as an output.

The reconstituting pulse output is applied to the base of a transistor 328. The transistor amplifies these signals and applies them to a potentiometer 330. The output of potentiometer comprising reconstituting pulses is applied to the RF amplifier 230 to increase its gain at the proper time, with the required amplitude, and over the required interval during the composite video signal while it is still modulated on the carrier. Tube and circuitry 324, 326 will be recognized as the pulse generator 1228 (FIGURE 11). The transistor emitter is biased through resistors 331, 332 which are connected from B+ to ground. The collector of the transistor 328 is connected to the neon glow tube 304, shown in FIGURE 13. Whenever the neon glow tube is made to glow as a result of the one-shot multivibrator 1290 being triggered, it blocks output from the transistor 328. This prevents horizontal sync from being inserted in the subscriber receiver. Thus, the warning to the subscriber that something is wrong with his settings of the selector switches occurs not only from the neon tube being illuminated, but also by the absence of sync signals, so that he cannot obtain an intelligible picture.

The relay 322 has another set of contacts 322B. These are single-pole, double-throw. The switching arm of these contacts, when relay 322 is not excited, connects the television set audio channel to the television set speaker coil. When relay 322 is excited, the speaker is directly connected to the output of the switch 316 in FIGURE 13. By this operation, the set will no longer reproduce the barker audio signal, but will reproduce the audio output which is received from the switch 316.

To summarize the operation of the receiver attachment, the subscriber who desires to listen to a subscription television program will operate the switch 1200 on the attachment to the "on" position. He will then set a coin-box (if not automatically set over the air) to the price being requested by the barker. He will also set the two selector switches 1280 and 1282 to the position indicated by the barker. He will then deposit the requested amount of coinage in the coinbox. If all settings are correct, the composite video while still modulated on the carrier will have its sync signals reconstituted, and the receiver will reproduce the video signals so that the program may be seen. The audio signals will also be received. If the switch settings are incorrect or the amount of coinage deposited is incorrect, then the neon glow tube 304 will be illuminated at one or more times during a count cycle, there will be a loss of sync, and program audio will not be properly reproduced.

Should the coinbox be of the type which is set automatically by signals received over the air, then until switch 1256 is set at the proper contact position in accordance with the price which is being established, the neon glow tube 304 will glow a warning that a price is being established. Such warning continues until switch 1256 is set at the proper position. The blocking of the pulse amplifier 328 has the effect of preventing an intelligible picture from appearing at the receiver. Further, the fact that the glow-transfer tube 1258 does not have count condition identity with the glow-transfer tube at the transmitter has the effect of preventing sound switching from occurring in synchronism with the sound switching at the transmitter, whereby the subscriber will not properly receive the program audio.

In the event that any switch setting is disturbed after payment, the subscriber loses the benefit of having paid and must make another payment to obtain the program video and audio again. If desired, suitable recording apparatus may be actuated at the time proper payment is made which can provide, at a subsequent time, information for properly allocating the payment. Such recording may be the switch settings either on paper tape or on a card, by means of extra contact decks on each switch which can be wired to the recording mechanism.

The cryptographic code may also be changed by changing the order with which said switch deck is connected to the glow-transfer tube. This may be done by bringing the tube and the various switch contacts to a contact box with connections being established by either punched-hole or printed-circuit cards. These cards may be changed whenever it is deemed necessary.

From the above, it will be seen that there has been described and shown a novel, useful arrangement for a subscription television system wherein the video signal at the transmitter is coded by removing the horizontal sync signal and blanking signal, and instead there is substituted a grey-level signal, the audio is coded by randomly switching it between two channels. The sync information is transmitted by a sine wave modulated on a suitable carrier. Code information for enabling recovery of the sound and sync signals is transmitted in the form of tones, one of which occurs at every field. The cryptographic arrangement is a simple one which, however, provides adequate security for the system. It enables the random switching of the audio and transmission of these tones randomly, except at a time when it is desired that the tone have a decoding significance. The receiver has an attachment with a counter and means to maintain this counter in count-condition identity with the counter at the transmitter. Such count-condition identity must be maintained in order that the two-tone signal be properly able to verify the price, to permit the proper insertion of synchronizing signals into the composite video signals, and to permit proper following of the program audio signals as it is being switched between two channels.

We claim:

1. A subscription television system comprising a transmitter and a receiver, said transmitter having means for generating television program signals including a composite video signal having horizontal blanking and synchronizing signals, means connected to receive the output of said means for generating for replacing said horizontal blanking and synchronizing signals with grey-level signals to produce modified composite video signals, means for generating reconstituting signals having the frequency of said synchronizing signals, and means connected to receive the output of said means to produce modified composite video signals for transmitting said modified composite video signals and said reconstituting signal respectively modulated on separate carriers; said receiver including means for receiving said modified composite video and said reconstituting signals respectively modulated on said separate carriers, means connected to receive the output of said means for receiving for demodulating said reconstituting signals from their carrier, means connected to receive the output of said means for demodulating for shaping said reconstituting signals into pulse signals, a coinbox including means for establishing the price for viewing said television program, and means connected to the output of said means for receiving said modified composite video and to the output of said means for shaping said reconstituting signals into pulse signals which is operable upon payment of said established price for reconstituting responsive to said pulse signals as horizontal synchronizing signals the grey level signals in said modified composite video modulated on said carrier.

2. A subscription television system comprising a transmitter and a receiver, said transmitter having means for generating television program signals including a composite video signal having horizontal blanking and synchronizing signals, means connected to receive output from said means for generating a composite video signal for replacing said horizontal blanking and synchronizing signals with grey-level signals to produce a modified composite video, means for generating reconstituting signals having the frequency of said horizontal synchronizing signals, a cyclic counter, means for continuously advancing the count state of said counter, means for generating two tones, means connected to said cyclic counter and to said means for generating two tones for selecting one or the other of said two tones for transmission responsive to each count of said counter, means connected to receive the tones selected by said means for selecting and to receive said modified composite video from said means to produce a modified composite video for inserting said selected tones within said modified composite video signal, and means connected to receive output from said means for inserting and output from said means for selecting for transmitting said modified composite video including said selected tones and said reconstituting signals modulated on separate carriers; a receiver including means for receiving said modified composite video and said reconstituting signals respectively modulated on separate carriers, means for demodulating said reconstituting signals from their carrier, means connected to receive output from said means for demodulating for shaping said reconstituting signals into pulse signals, means connected connected to receive output from said means for receiving for separating said tones from said modified composite video, a coinbox including means for establishing the price for viewing said television program, means connected to receive output from said means for separating responsive to said tones for verifying that the correct price has been established in said coinbox, and means connected to receive output from said means for receiving and said means for shaping said reconstituting signals into pulse signals operable upon payment of said established price for reconstituting responsive to said pulse signals as horizontal synchronizing signals the grey level signals in said modified composite video.

3. A subscription television system as recited in claim 2 wherein said means responsive to said tone signals for verifying that the correct price has been established in said coinbox includes a cyclic counter substantially identical with the one in said transmitter, a selector switch comprising a plurality of terminals and a movable selector arm for selecting any one of said terminals, each of said terminals being connected to receive a different count output from said counter, means for coupling said selector arm to said coinbox for selecting one of said terminals in accordance with the price established in said coinbox, means connected to said means for separating said tones from said modified composite video for applying said tone signals to said cyclic counter to advance its count, means connected to said means for separating said tones from said modified composite video and to the output of said cyclic counter for inhibiting said means for applying responsive to the simultaneous occurrence of a predetermined one of said two tone signals and a count output from said counter being present on said selector arm, inactive alarm means, and means connected to the output of said means for separating said tones and said cyclic counter for activating said alarm means responsive to the simultaneous occurrence of a count output and tone signals other than said second tone signal to indicate that said cyclic counter does not have the same count condition as the counter at said transmitter.

4. A subscription television system comprising a transmitter and a receiver, said transmitter having means for generating television program signals including audio signals and composite video signals having horizontal blanking and synchronizing signals, means for generating audio nonsense signals from said audio signals, a first cyclic counter, means connected to said first cyclic counter for regularly advancing the count state of said first cyclic counter, a second cyclic counter, means connected to said second cyclic counter for randomly advancing the count state of said second cyclic counter, a first and second transmission channel connected to receive output from said means for generating television program signals and from said means for generating audio-nonsense signals for transmitting said audio and audio nonsense signals, means connected to said means for generating television program signals and to the outputs of said first and second cyclic counters for applying said audio signals to said first transmission channel and said audio-nonsense signals to said second transmission channel upon the occurrence of first predetermined count conditions of said first and second cyclic counters, means connected to receive output of said means for generating television program signals and said first and second cyclic counters for applying said audio signals to said second transmission channel and said audio-nonsense signals to said first transmission channel upon occurrence of second predetermined count conditions of said first and second cyclic counters, means for generating two tones, means connected to receive the output of said means for generating two tones for selecting one or the other of said two tones, means connected to the output of said first and second cyclic counters and to said means for selecting for ordering said means for selecting to select said one of said two tones upon the occurrence of said first predetermined count conditions, means connected to the output of said first and second cyclic counters and to said means for selecting for ordering said means for selecting to select said other of said two tones upon the occurrence of said second predetermined count conditions, means connected to receive the output of said means for selecting and to the output of said means for generating television program signals for inserting the tones selected into said composite video signals, and means connected to the output of said means for inserting and said first and second transmission channels for transmitting said composite video signals with tones and the output of said first and second transmission channels, said receiver including means for receiving said transmitted composite video and the output of said first and second transmission channels, means connected to the output of said means for receiving for separating said tones from said composite video, a coinbox having means for establishing the price for said program, switch means connected to the output of said means for receiving for selecting the output of said first or second transmission channels, means connected to the output of said means for separating said tones for applying said required tones for controlling said switch means to always select the channel over which said audio signals are being transmitted, and means operatively connected to said coinbox for making the output of said switch means available to a subscriber receiver upon the payment of the price established in said coinbox.

5. A subscription television system as recited in claim 4 wherein said means for controlling said switch means to always select the channel over which said audio signals are being transmitted includes a third cyclic counter, means connected to the output of said means for separating said tones from said composite video for advancing the count of said third cyclic counter, means connected to said third cyclic counter output for selecting a first and a second predetermined count output from said third cyclic counter, means connected to the output of said means for separating said tones from said composite video for controlling said switch to select output from said first transmission channel upon the occurrence of one of said received tones and a first predetermined count output and means connected to the output of said third cyclic counter and rendered operative upon the occurrence of a second predetermined count condition to control said switch to select output from said second transmission channel.

6. A subscription television system comprising a transmitter and a receiver, said transmitter having means for generating television program signals including audio signals and composite video signals having horizontal blanking and synchronizing signals, means for generating audio nonsense signals from said audio signals, a first cyclic counter, means connected to said first cyclic counter for regularly advancing the count state of said first cyclic counter, a second cyclic counter, means connected to said second cyclic counter for randomly advancing the count state of said second cyclic counter, a first and second transmission channel connected to said means for generating television program signals and to said means for generating audio nonsense signals for transmitting said audio and audio nonsense signals, means connected to the outputs of said first and second cyclic counters and rendered operative upon the occurrence of first predetermined count conditions of said first and second cyclic counters to apply said audio signals to said first transmission channel and said audio nonsense signals to said second transmission channel, means connected to the outputs of said first and second counters and rendered operative upon the occurrence of second predetermined count conditions of said first and second cyclic counters to apply said audio signals to said second transmission channel and said audio nonsense signals to said first transmission channel, means for generating two tones, means connected to receive output from said means for generating two tones for selecting one or the other of said two tones, means connected to said means for selecting and to the output of said first and second cyclic counters for ordering said means for selecting to select said one of said two tones upon the occurrence of said first predetermined count conditions, means connected to said means for selecting and to the outputs of said first and second counters for ordering said means for selecting to select said other of said two tones upon the occurrence of said second predetermined count conditions, means connected to the output of said means for generating television signals and to the output of said means for selecting for replacing said composite video horizontal blanking and synchronizing signals with grey-level signals and for inserting the tones selected into said composite video to modified composite video signals, means for generating a sine wave having the frequency of said horizontal synchronizing signals, means connected to said means for replacing, said means for generating a sine wave, and the output of said first and second transmission channels for modulating and transmitting on separate carriers said modified composite video signals, the output of said first and second transmission channels and said sine wave; said receiver including means for receiving said transmitted composite video, said sine wave, and the output of said first and second channels on their respective separate carriers, means connected to the output of said means for receiving for separating said tones from said composite video, a coinbox including means for establishing the price for viewing said television program, means connected to said means for separating said tones and to said coinbox responsive to said tones for verifying that the correct price has been established in said coinbox, means for demodulating said received sine waves, means connected to said means for demodulating for shaping said sine waves into pulse signals, switch means connected to the output of said means for receiving for selecting the output of said first or second transmission channels, means connected to said means for separating said tones and to said switch means for controlling said switch means responsive to said tones to always select the channel over which said audio signals are being transmitted, and means connected to said coinbox and to said switch means actuated responsive to payment of the price established in said coinbox to make the output of said switch means available, inoperative means to reconstitute as horizontal synchronizing signals the grey level signals in said modified composite video signals while still modified on said carrier responsive to said pulse signals, and means connected to said coinbox and to said inoperative means for rendering said inoperative means operative upon the payment of the price established in said coinbox.

7. A subscription television transmitter including means for generating television program signals including audio signals and composite video signals having horizontal blanking and horizontal and vertical synchronizing signals, means connected to said means for generating television program signals for generating audio nonsense signals from said audio signals, a first cyclic counter, means to apply said vertical synchronizing signals to said first cyclic counter to advance said first cyclic counter, means connected to the output of said first cyclic counter including a plugboard for deriving an output for each count state of said first cyclic counter, a second cyclic counter, means connected to said second cyclic counter for randomly advancing the count state of said second counter, a first and second transmission channel, means connected to the output of said first and second cyclic counters and to said means for generating television program signals and to said means for generating audio nonsense signals, rendered operative upon the occurrence of first predetermined count conditions of said first and second cyclic counters to apply said audio signals to said first transmission channel and said audio nonsense signals to said second transmission channel, means connected to the output of said means for generating television program signals, said means for generating audio nonsense signals and to said first and second cyclic counters and rendered operative upon the occurrence of second predetermined count conditions of said first and second cyclic counters to apply said audio signals to said second transmission channel and said audio nonsense signals to said first transmission channel, mean for generating two tones, means connected to said means for generating two tones for selecting one or the other of said two tones for each count of said first cyclic counter, means connected to said means for selecting and to the output of said means for generating two tones for ordering said means for selecting to select said one of said two tones upon the occurrence of said first predetermined count condition, means connected to said means for selecting and to the output of said means for generating two tones for ordering said means for selecting to select said other of said two tones upon the occurrence of said second predetermined count conditions, means for establishing a grey-level signal, means connected to said means for generating television program signals, said means for establishing the grey level signal, and to said means for selecting for blanking said composite video signal during horizontal blanking intervals and inserting said grey-level signal instead and for blanking said composite video signal during the occurrence to tones in the output of said means for selecting and inserting said tones instead, means for generating a sine-wave signal at the frequency of said horizontal synchronizing signals, and means connected to said means for blanking and to said means for generating a sine wave signal for transmitting said sine-wave signals, the output of said means for blanking said composite video signals and the output of said first and second transmission channels.

8. A subscription television transmitter including means for generating television program signals including composite video signals having horizontal blanking and horizontal and vertical synchronizing signals, a cyclic counter, means connected to said cyclic counter to advance said cyclic counter responsive to said vertical synchronizing signals, means connected to said cyclic counter including a plugboard for deriving an output for each count of said cyclic counter, means for generating two tones, means connected to said means for generating two tones to said cyclic counter and to said means for generating television program signals for selecting one or the other of said tones responsive to each count output for a predetermined portion of each vertical drive signal, means for establishing a grey-level signal, means connected to said means for generating television program signals and to said means for selecting one or the other of said tones for blanking said composite video signals during horizontal blanking intervals and inserting said grey-level signal instead and for blanking said composite video during the occurrence of output from said means for selecting and inserting said tones instead, means for generating a sine-wave signal at the frequency of said horizontal synchronizing signals, and means connected to said means for generating a sine wave signal and to said means for blanking said composite video signal for transmitting said sine-wave signals and the output of said means for blanking said composite video signals.

9. In a subscription television system of the type wherein there are transmitted modified composite video signals having grey-level signals in place of horizontal blanking and synchronizing signals, and one or the other of two tone signals within each field, and a sine-wave signal having the frequency of said horizontal synchronizing signals, an attachment for a subscriber receiver including means for separating said two tone signals from said modified composite video, coinbox means for establishing the price of correcting said modified composite video signals, means connected to said means for separating said two tone signals and to said coinbox means for verifying that the price established by said coinbox means is correct responsive to said tone signals, means for shaping said sine-wave signals into pulse signals, and means connected to said coinbox means responsive to the payment of the correct price established by said coinbox means for enabling amplification responsive to said pulse signals of the grey level signals in said modified composite video signals to compensate said modified composite video signals for the modification.

10. In a subscription television system of the type wherein there are transmitted modified composite video signals as recited in claim 9 wherein said means responsive to said tone signals for verifying that the correct price has been established in said coinbox includes a cyclic counter, a first, second, and third selector switch each comprising a plurality of terminals and a selector arm, each of the terminals of each of said selector switches being connected to receive a different count output from said counter, means for coupling said first selector-switch selector arm to said coinbox for selecting one of said terminals in accordance with the price established in said coinbox, means for applying said tone signals to said cyclic counter to advance its count, means for inhibiting said means for applying responsive to a simultaneous occurrence of a predetermined one of said two tone signals and a count output from said counter being present on said first selector arm, means for setting said second and third selector arms to select terminals in accordance with predetermined information, an inactive visual indicator, and means responsive to the occurrence of one of said two tones and a count output being present on one or the other of said two selector arms for actuating said visual indicator.

11. In a subscription television system of the type wherein there are transmitted modified composite video signals having grey-level signals in place of horizontal blanking and synchronizing signals and one or the other of two tone signals in each field, a sine-wave signal having the frequency of said horizontal synchronizing signals, and audio and audio nonsense signals which are aperiodically switched between two channels at said transmitter which switch is signalled by said two tones, an attachment for a subscriber receiver including means for receiving all the transmitted signals, means connected to said means for receiving for separating said two tone signals from said modified composite video, coinbox means connected to said means for receiving for establishing a price for compensating the modification of said modified composite video and for receiving said audio signals, means connected to said means for receiving responsive to said tone signals for selecting the one of said two channels transmitting audio signals, means connected to said means for receiving for shaping said sine-wave signals into pulse signals, and means connected to said coinbox to said means for receiving to said means for selecting and to said means for shaping payment of the price established by said coinbox means for enabling amplification responsive to said pulses of said modified composite video signals to compensate for the modification thereof and for enabling the application of the output of said selecting means to the subscriber receiver.

12. In a subscription television system of the type wherein there are transmitted modified composite video signals having grey-level signals in place of horizontal blanking and synchronizing signals and one or the other of two tone signals in each field, a sine-wave signal having the frequency of said horizontal synchronizing signals, and audio and audio nonsense signals which are aperiodically switched between two channels at said transmitter which switch is signalled by said two tones, an attachment for a subscriber receiver including means for separating said two tone signals from said modified composite video, coinbox means for establishing a price required to be paid for obtaining compensation for the modification of said modified composite video and for receiving said audio signals, a cyclic counter, at least five selector switches each having a selector arm and a plurality of terminals, means for connecting the plurality of terminals of each selector switch to different count outputs of said cyclic counter, means for coupling the selector arm of a first of said selector switches to said coinbox for selecting one of said terminals in accordance with the price established in said coinbox, means for advancing the count of said cyclic counter upon the application thereto of one or the other of said tone signals, means for applying the output of said means for separating said two tones to said means for advancing the counts of said counter, means for inhibiting the operation of said means for advancing upon the occurrence of a predetermined one of said two tone signals and a counter output being present on said first selector switch arm, means for setting the selector arms to select predetermined terminals of the second, third, fourth and fifth of said selector switches, an inactive visual indicator, means responsive to the occurrence of one of said two tone signals and a count output being present on the second or third of said selector arms for actuating said visual indicator, means for selecting the output of one or the other of said two transmission channels to follow the switching of said audio signals respectively upon receiving one of said two tone signals and a count output being present on the arm of the fourth of said selector switches and upon receiving the other of said two tone signals and a count output being present on the arm of the fifth of said selector switches, means for applying the output of said means for separating said two tone signals to said means for selecting the output of one or the other of said transmission channels, means for shaping said sine waves into pulse signals, means coupled to said coinbox means and operative upon payment of the price established into said coinbox means to make the output of said means for selecting the output of one or the other of said two transmission channels available to a subscriber receiver, means responsive to payment of the price established by said coinbox for enabling the amplification responsive to said pulses of said modified composite video signals to compensate for the modification thereof, and means connected to said visual indicator, and rendered operative upon said visual indicator being activated to prevent the amplification of said modified composite video signals responsive to said pulses.

13. In a subscription television system wherein a price determined at a transmitter is to be indicated at a subscriber receiver for viewing a program comprising at said transmitter a first cyclic counter, means coupled to said first cyclic counter for regularly advancing the count state of said first cyclic counter, a second cyclic counter, means coupled to said second cyclic counter for randomly advancing the count state of said second cyclic counter, means for generating two tones, means coupled to said first and second cyclic counters for selecting first predetermined count conditions of said first and second cyclic counters, means to which is applied said two tones and the output of said means for selecting first predetermined count conditions for selecting one of said two tones upon the occurrence of said first predetermined count conditions of said first and second cyclic counters, means coupled to said first and second cyclic counters for selecting second predetermined count conditions of said first and second cyclic counters, means to which is applied said two tones and the output of said means for selecting second predetermined count conditions for selecting the other of said two tones upon the occurrence of said second predetermined count conditions of said first and second cyclic counters, means coupled to said first cyclic counter for selecting a third predetermined count condition corresponding to a price to be charged at a subscriber receiver, means to which is applied said two tones and the output of said means for selecting third predetermined count conditions for selecting said one of said two tones at said third predetermined count condition of said first cyclic counter corresponding to said price to be charged regardless of the count condition of said second cyclic counter, and means to which the outputs of all said means for selecting are applied for transmitting said selected tones; a receiver having means for receiving said selected tones, a variable price-indicating means, a selector switch comprising a plurality of terminals and a movable selector arm for contacting one of said plurality of terminals, coupling means between said variable price-indicating means and said selector arm for moving said selector arm to a different one of said plurality of terminals for each different price indicated by said variable price-indicating means, a third cyclic counter having an output for each count state, means for applying a different one of said third cyclic counter outputs to a different one of said selector switch terminals, means for applying said received selected tones to said third cyclic counter to advance its count responsive thereto, an inhibiting means connected to said selector switch selector arm and to which said received tones are applied for preventing said third cyclic counter from advancing its count responsive to said other of said two tones and a third cyclic counter output being present on the terminal contacted by said selector arm whereby said third cyclic counter will assume and maintain an identical count state with said first cyclic counter only when said variable price-indicating means is set to establish said selector arm in contact with the terminal connected to the count output of said third cyclic counter corresponding to the third predetermined count of said first cyclic counter.

14. In a subscription television system of the type wherein a price determined at a transmitter for viewing a program is to be established at a receiver and there is transmitted a key code means for indicating a different program price for each different one of said plurality of terminals contacted by said selector switch arm, which comprises transmitting repetitively over a predetermined interval said key code as the same number of tone signals, all but one of which are randomly selected from sources of different characteristic tone signals, a receiver for utilizing said key code including means for receiving said tone signals, a cyclic counter having a count capacity determined by the number of tone signals transmitted over said predetermined interval, means for applying said tone signals to said counter to advance its count responsive to each one thereof, a selector switch having a plurality of terminals and a selector switch arm for contacting a different one of said plurality of terminals, means for indicating a different program price for each different one of said plurality of terminals contacted by said selector switch arm, means for connecting a different one of said terminals to receive a different count output of said counter, and inhibiting means connected to said selector switch arm and to which said received tones are applied for preventing said counter from advancing its count responsive to tone signals other than said one tone signal and to said selector arm contacting a terminal to which said counter is applying output whereby when said counter counts through its count capacity over said predetermined interval said receiver is utilizing properly said key code and the program price transmitted is indicated by the terminal to which said selector switch arm is connected.

15. In a subscription television system of the type wherein a price determined at a transmitter is to be indicated at a receiver to a subscriber for rendering intelligible a program and wherein a code representing said price is transmitted as the same number of tone signals repetitively over a predetermined interval all but a first and second of which are randomly selected from sources of different characteristic tone signals, said first and second tone signals being selected to occur at specified times within said recurrent intervals, a subscriber receiver comprising means for receiving said tone signals, a cyclic counter having a count capacity determined by the number of tone signals occurring within said predetermined interval, means for applying said received tone signals to said counter to advance its count responsive to each one thereof, a first and second selector switch each having a selector arm and a plurality of terminals, a different one of which may be contacted by said selector arm, each of said first selector switch terminals being associated with a different price, means for connecting a different one of said first and second selector switch terminals to said counter for receiving a different count output of said counter, inhibiting means connected to said first selector switch arm and to which said received tones are applied for preventing said counter from advancing its count responsive to tone signals other than said first tone signal and said selector arm contacting a terminal to which said counter is applying output whereby said counter counts through its count capacity over said predetermined interval when the selector arm of said first selector switch contacts a terminal associated with a desired price, a normally inactive indicator, means to activate said indicator responsive to the simultaneous application of a count output and tone signals other than said second tone signal, means to connect said second selector switch selector arm to said means to activate said indicator, and means to apply said tone signals to said means to activate said indicator, whereby said indicator is activated when said first selector switch is not at a terminal position associated with said desired price and said second selector switch is at a terminal position which does not correspond to the selected time for the selection of said second tone and when said indicator is not activated said selector arm of said first selector switch is contacting a terminal associated with the price determined at said transmitter.

16. In a subscription television system of the type wherein a price is to be indicated at a receiver to a subscriber for intelligibly obtaining audio program signals, said audio program signals and audio nonsense signals being aperiodically switched between two channels over which they are simultaneously transmitted, which switch is signalled by tone signals, said tone signals being transmitted as one or the other of two tone signals the same number of which are transmitted repetitively over a predetermined interval, all but a first, second, and third of said tone signals being randomly selected, said first, second, and third tones being selected to occur at specified times within said recurrent intervals, a subscriber receiver comprising means for receiving said tone signals, means for separately receiving said two transmission channels over which said audio program signals and audio nonsense signals are transmitted, a cyclic counter having a count capacity determined by the number of tone signals occurring within said predetermined interval, means for applying said received tone signals to said counter to advance its count responsive to each one thereof, a first, second, and third selector switch each having a selector arm and a plurality of terminals, a different one of which may be contacted by said selector arm, each of said first selector switch terminals being associated with a different price, means for connecting a different one of said first, second, and third selector switch terminals to said counter for receiving a different count output of said counter, inhibiting means connected to said first selector switch arm and to which said received tones are applied for preventing said counter from advancing its count responsive to tone signals other than said first tone signal and said selector arm contacting a terminal to which said counter is applying output whereby said counter counts through its count capacity over said predetermined interval when the selector arm of said first selector switch contacts a terminal associated with a desired price, a switch circuit having a single output, a first input, a second input, and means responsive to a first signal for connecting said first input to said output and responsive to a second signal for connecting said second input to said output, means for applying signals received over one of said received transmission channels to one of said switch circuit inputs, means for applying signals received over the other of said received transmission channels to the other of said switch circuit inputs, a first AND gate having two inputs, means for applying one of the received tones to one of said first AND gate inputs, means for connecting said second selector switch selector arm to the other of said first AND gate inputs, means to apply output from said first AND gate to said switch circuit as a first signal, a second AND gate having two inputs, means for applying the other of the received tones to one of said second AND gate inputs, means for connecting said third selector switch selector arm to the other of said second AND gate inputs, and means for applying output from said second AND gate to said switch circuit as a second signal whereby when said second and third selector switches respectively have their selector arms contacting terminals which receive counter outputs corresponding to the specified times of said second and third tones said switch circuit output will contain only said audio program signals.

17. A receiver for key code signals of the type wherein a transmitter transmits a sequence of tone signals all but one of which are selected at random from a source of tone signals, said receiver including means for receiving said tone signals, a counter, means for applying said received tone signals to said counter for advancing its count responsive to each tone signal, a selector switch having a plurality of terminals and a selector arm for selectively contacting one of said plurality of terminals, means for connecting a different one of said terminals to receive a different count state output of said counter, an inoperative inhibiting means for preventing said counter from responding to a received tone signal, and means connected to said selector arm and to which said received tones are applied to render said inhibiting means operative responsive to an output from said counter and to a tone signal other than said one tone signal.

18. A receiver for key code signals of the type wherein a first cyclic counter is driven successively through its count states and for all but a predetermined one of its count states there is randomly selected for transmission one of two different type tone signals, at said predetermined count state a predetermined one type of said tone signals is transmitted, said receiver including means for receiving said tone signals, a second counter, means for applying one type of said received tone signals to said counter for advancing its count state responsive thereto, means for applying the other type of said received tone signals to said counter for advancing its count state responsive thereto, a selector switch having a plurality of terminals and a selector arm for selectively contacting one of said plurality of terminals, means for connecting a different one of said terminals to receive a different count state output of said second counter, and means connected to said selector arm to block said means for applying said other type of received tone signal to said counter responsive to a second counter count output from said selector switch arm at the time.

19. Apparatus for synchronizing the count state and advance of a second cyclic counter at a receiver with a first cyclic counter at a transmitter comprising a source of two different characteristic tone signals, means for advancing said first cyclic counter through its successive count states, means for selecting at a predetermined count a predetermined one of said two different characteristic tone signals, means for selecting at random one of the tone signals from said source of two different characteristic tone signals for each count other than said predetermined count, means for successively transmitting said selected tone signals, means for receiving said transmitted tone signals, means for applying one of said received different characteristic tone signals to said second cyclic counter to advance its count responsive thereto, means for applying the other of said received different characteristic tone signals to said second cyclic counter to advance its count responsive thereto, a selector switch having a plurality of terminals and a switch arm for contacting selectively one of said plurality of terminals, means for connecting a different one of said terminals to receive a different count state output of said second counter, and means connected to said selector arm to block said means for applying said other type of received tone signal to said counter responsive to a second counter count output from said selector switch arm at the time, whereby when said selector switch arm contacts a terminal connected to receive the same count output from said second counter as said predetermined count at said first counter said second counter can attain and maintain count synchronization with said first counter.

References Cited in the file of this patent

UNITED STATES PATENTS

| | | |
|---|---|---|
| 2,510,046 | Ellett | May 30, 1950 |
| 2,567,539 | Aram | Sept. 11, 1951 |
| 2,769,024 | Del Riccio | Oct. 30, 1956 |
| 2,843,655 | Gottfried | July 15, 1958 |
| 2,843,656 | Morris | July 15, 1958 |
| 2,864,885 | Morris | Dec. 16, 1958 |
| 2,875,270 | Wendt | Feb. 24, 1959 |
| 2,907,816 | Weiss | Oct. 6, 1959 |

OTHER REFERENCES

Fundamental Problems of Subscription Television, "The Logical Organization of the Telemeter System," Journal of the S.M.P.T.E., vol. 61, August 1953. Pages 183–194 (copy available in the U.S. Patent Office Library).